US009429716B1

(12) United States Patent
Elkins, II et al.

(10) Patent No.: US 9,429,716 B1
(45) Date of Patent: Aug. 30, 2016

(54) MIRROR SYSTEMS SECURING OPTICAL FIBERS TO FERRULES BY THERMALLY SECURING BONDING AGENTS WITHIN FIBER OPTIC CONNECTOR HOUSINGS, AND RELATED METHODS AND ASSEMBLIES

(71) Applicant: Corning Cable Systems LLC, Hickory, NC (US)

(72) Inventors: Robert Bruce Elkins, II, Hickory, NC (US); Andrey Kobyakov, Hickory, NC (US); Sergey Anatol'evich Kuchinsky, St. Petersburg (RU); Aramais Zakharian, Painted Post, NY (US)

(73) Assignee: Corning Cable Systems LLC, Hickory, NC (US)

( * ) Notice: Subject to any disclaimer, the term of this patent is extended or adjusted under 35 U.S.C. 154(b) by 154 days.

(21) Appl. No.: 14/099,920

(22) Filed: Dec. 7, 2013

Related U.S. Application Data

(60) Provisional application No. 61/863,102, filed on Aug. 7, 2013, provisional application No. 61/830,226, filed on Jun. 3, 2013.

(51) Int. Cl.
*G02B 6/36* (2006.01)
*G02B 6/38* (2006.01)

(52) U.S. Cl.
CPC .................................. *G02B 6/3861* (2013.01)

(58) Field of Classification Search
CPC ........ G02B 6/36; G02B 6/38; G02B 6/3833; G02B 6/3861; G02B 6/381; G02B 6/3855; G02B 6/3846; G02B 6/2551; Y10T 29/4989
See application file for complete search history.

(56) References Cited

U.S. PATENT DOCUMENTS

| 5,772,720 A | 6/1998 | Taira-Griffin et al. ......... 65/387 |
| 6,419,405 B1 | 7/2002 | Boscha ............................ 385/93 |
| 2004/0238110 A1* | 12/2004 | Flanagan .......... A61M 25/1025 156/272.8 |

(Continued)

FOREIGN PATENT DOCUMENTS

| JP | 2001221921 A | 8/2001 | ............... G02B 6/00 |
| JP | 2004144920 A | 5/2004 | ............... G02B 6/36 |
| WO | 2012/098456 A4 | 7/2012 | ............... G02B 6/38 |

OTHER PUBLICATIONS

Comsol Multiphysics Version 4.3b, Heat Transfer Module User's Guide, May 2013, 10 pages.

(Continued)

*Primary Examiner* — Daniel McNally

(57) ABSTRACT

Mirror systems securing optical fibers to ferrules by thermally securing bonding agents within fiber optic connector housings are disclosed, along with related methods and assemblies. A fiber optic connector includes an optical fiber secured within a ferrule by a temperature-sensitive bonding agent to prevent attenuation-causing movement. The bonding agent is activated (e.g., cured) by heat provided by laser energy incident upon the ferrule, which is at least partially disposed within a fiber optic connector housing and which may be damaged by the laser energy. By shaping and disposing at least one mirror of a mirror system, the laser energy may be reflected to be incident upon the ferrule in a controllable intensity distribution. In this manner, the laser energy may be absorbed uniformly or substantially uniformly along a partial length of the ferrule extending into the housing to accelerate securing of the bonding agent while avoiding damage to the housing.

21 Claims, 15 Drawing Sheets

(56) References Cited

U.S. PATENT DOCUMENTS

2010/0320177 A1* 12/2010 Ramsayer ............ B23K 26/032
                                                      219/121.67
2011/0100066 A1* 5/2011 Bohme .............. B23K 26/0734
                                                      65/501

OTHER PUBLICATIONS iiviinfrared.html, Zinc Selenide, downloaded from internet on Apr. 28, 2016, 3 pages.

Zemax LLC, Optic Design Program User's Manual, downloaded from internet on Apr. 28, 2016, 12 pages.

Synowicki, et al., Optical properties of bulk c-ZrO2, c-MgO and a-As2S3 determined by variable angle spectroscopic ellipsometry, Elsevier, 2004, 8 pages.

RefractiveIndex, Optical constants of ZnSe (Zinc selenide), downloaded from internet on Apr. 28, 2016, 2 pages.

Edward D. Palik, Handbook of Optical Constants of Solids, Academic Press, New York, 1998, 21 pages.

* cited by examiner

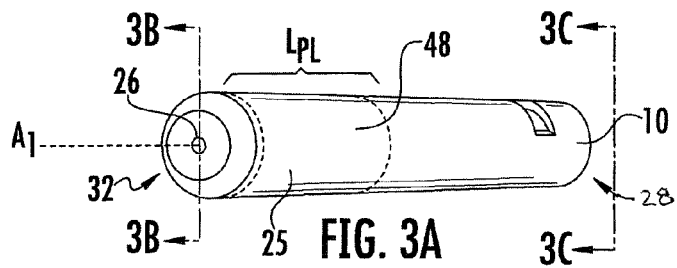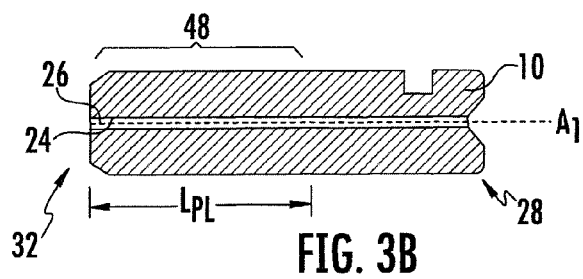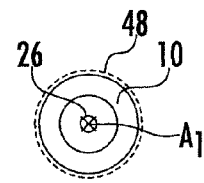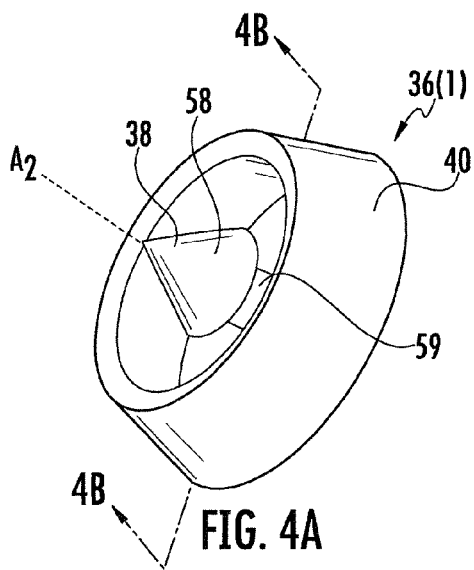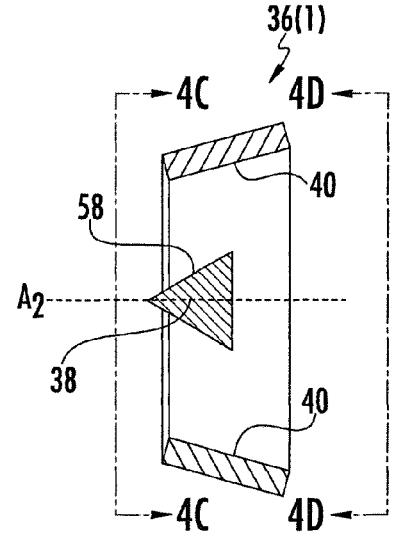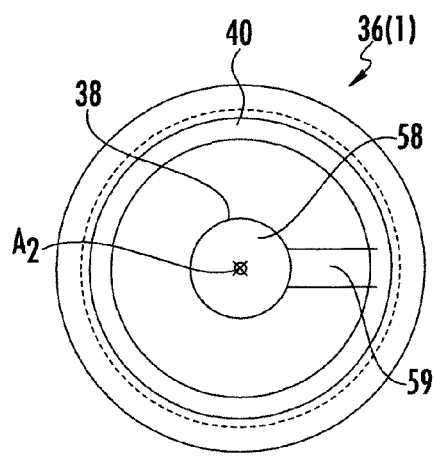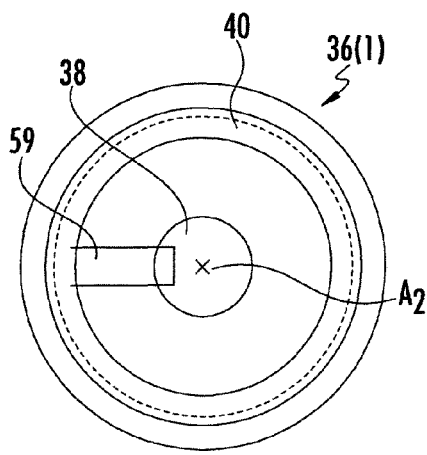

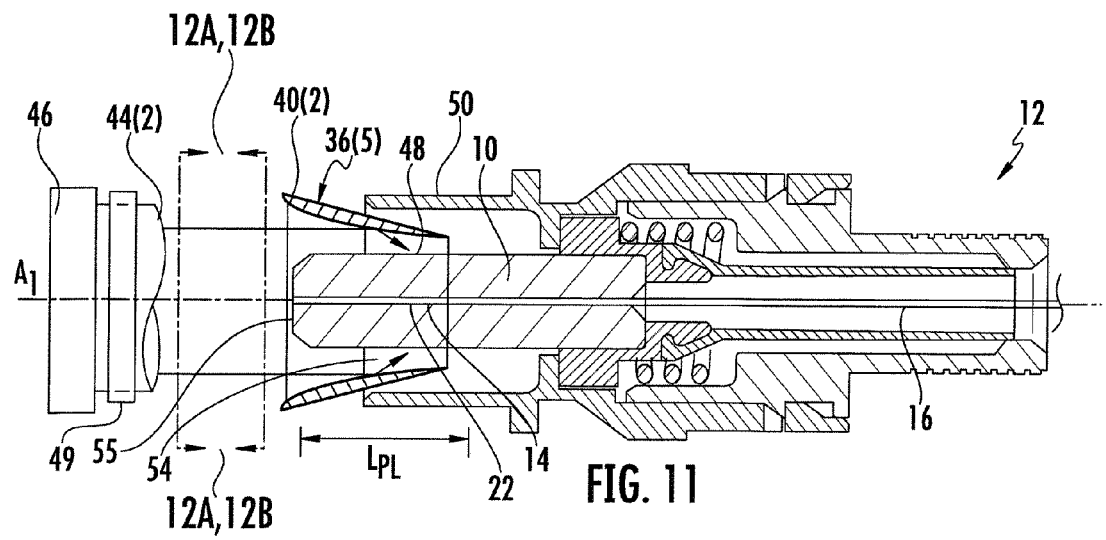
FIG. 11
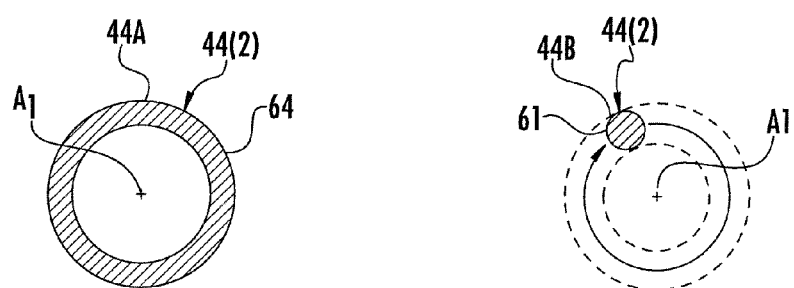
FIG. 12A
FIG. 12B

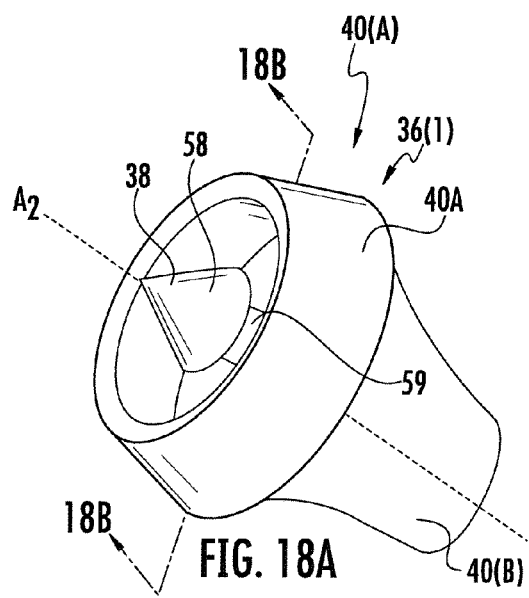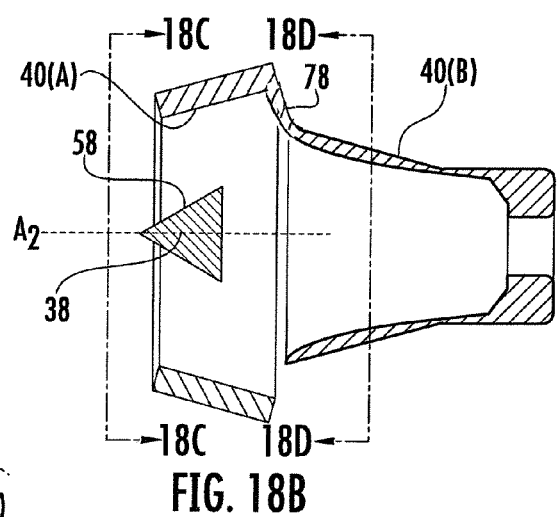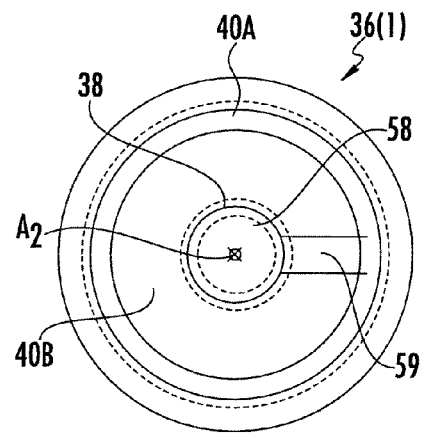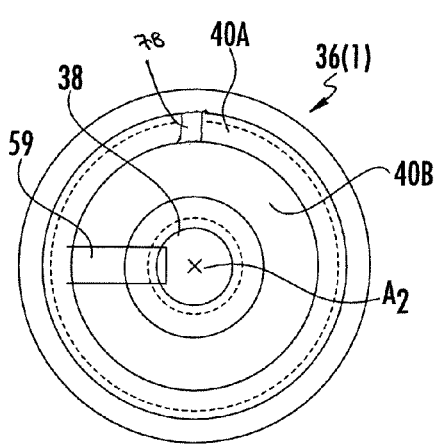
FIG. 18A
FIG. 18B
FIG. 18C
FIG. 18D

MIRROR SYSTEMS SECURING OPTICAL FIBERS TO FERRULES BY THERMALLY SECURING BONDING AGENTS WITHIN FIBER OPTIC CONNECTOR HOUSINGS, AND RELATED METHODS AND ASSEMBLIES

RELATED APPLICATIONS

This application claims the benefit of priority under 35 U.S.C. §119 of U.S. Provisional Application Ser. No. 61/863,102 filed on Aug. 7, 2013, and U.S. Provisional Application Ser. No. 61/830,226 filed on Jun. 3, 2013, the content of both is relied upon and incorporated herein by reference in their entirety.

BACKGROUND

The field of the disclosure relates generally to fiber optic equipment and more particularly to methods and assemblies for securing an optical fiber to a ferrule, which may be used within fiber optic connectors.

Benefits of optical fibers include extremely wide bandwidth and low noise operation. In cases where high bandwidth is required between two interconnection locations, fiber optic cables having fiber optic connectors may be used to communicate information between these locations. The fiber optic connectors may also be used to conveniently connect and disconnect the fiber optic cables from the interconnection locations when maintenance and upgrades occur.

Each of the fiber optic connectors may include a ferrule assembly having a ferrule and an optical fiber. The ferrule has several purposes. The ferrule includes an internal pathway, called a ferrule bore, through which the optical fiber is supported and protected. The ferrule bore also includes an opening at an end face of the ferrule. The opening is where an optical surface of an end portion of the optical fiber may be precisely located to be proximate to an optical surface of an end portion of another optical fiber of a complementary connector. The end portion of the optical fiber needs to be precisely secured to the ferrule or the optical fiber may move within the ferrule bore, resulting in an uncertain position between the optical surface of the optical fiber and the optical fiber of the complementary connector. In this regard, an unwanted gap may develop between the proximate optical fibers and signal loss, otherwise known as attenuation, may occur.

A bonding agent, for example an epoxy resin, is one approach to secure the optical fiber to the ferrule, but there are manufacturing issues with this approach. Specifically, the ferrule is first assembled to a fiber optic connector housing to minimize mechanical assembly from occurring when the optical fiber is disposed within the ferrule bore and to facilitate the assembly process. The optical fiber and an uncured bonding agent are later inserted within the ferrule bore. The optical fiber may then be secured to the ferrule by a process called "curing" of the bonding agent. Curing is a chemical process specific for different types of bonding agents wherein the bonding agent forms cross-linked thermoset structures, thus enabling secure bonds to be created between proximate objects. For many bonding agents compatible to secure the optical fiber to the ferrule, heat is required to bring the temperature of the bonding agent to a securing temperature, which may be from approximately eighty-five (85) to two-hundred (200) degrees Celsius, to facilitate the bonding required of the bonding agent during curing to secure the optical fiber to the ferrule. If the temperature does not reach this value, then a reduced percentage of bonding may occur, and the optical fiber may be inadequately secured to the ferrule. To provide the heat to elevate the temperature, the optical fiber and ferrule are typically heated in an oven relatively slowly, for example approximately twenty (20) minutes, to elevate the temperature of the bonding agent without damaging the fiber optic housing, which may be damaged by applying more intense heat to speed curing. The relatively slow heating process to protect the housing imposes a significant restriction on manufacturing efficiency.

Other heating devices, such as lasers, have been used to heat ferrules, and thereby cure the bonding agent disposed therein, so that faster curing can occur. However, for ferrules mostly enclosed within fiber optic connector housings, lasers are used only to directly heat merely a tip of the ferrule to avoid damaging the fiber optic connector housing. Laser heating only the tip may result in poor adhesion between the optical fiber and the ferrule, because the amount of bonding agent that is cured is insufficient to provide the strength needed for many fiber optic connector applications. Further, the bonding agent located at the tip of the ferrule may be damaged from intense local heating from the laser.

It is noted that other examples of the bonding agents, for example, adhesives and/or cohesives, may be used without the curing involving cross-linked thermoset materials, but may be thermally activated by heating to a securing temperature so that the optical fiber may be secured to the ferrule. For these other bonding agents, the technical challenge remains the same, wherein heat needs to be delivered to the bonding agent without damaging the fiber optic connector housing.

What is desired is a more cost-effective and efficient method to secure the optical fiber to the ferrule, to minimize attenuation without damaging the fiber optic connector housing.

No admission is made that any reference cited herein constitutes prior art. Applicant expressly reserves the right to challenge the accuracy and pertinency of any cited documents.

SUMMARY

Embodiments disclosed herein include mirror systems securing optical fibers to ferrules by thermally securing bonding agents within fiber optic connector housings. Related methods and assemblies are also disclosed. A fiber optic connector includes an optical fiber secured within a ferrule by a temperature-sensitive bonding agent to prevent attenuation-causing movement. The bonding agent is cured by heat provided by laser energy incident upon the ferrule, which is at least partially disposed within a fiber optic connector housing which may be damaged by the laser energy. By shaping and disposing at least one mirror of a mirror system, the laser energy may be reflected to be incident upon the ferrule in a controllable intensity distribution. In this manner, the laser energy may be absorbed uniformly or substantially uniformly along at least a partial length of the ferrule extending into the housing to accelerate securing of the bonding agent while avoiding damage to the housing.

One embodiment of the disclosure relates to a method for securing an optical fiber to a ferrule that is at least partially disposed within a fiber optic connector housing. The method comprises disposing an end portion of an optical fiber and a temperature-sensitive bonding agent within a ferrule bore of a ferrule. The ferrule is at least partially disposed within a fiber optic connector housing. The method also comprises emitting a laser beam from a laser toward a mirror system disposed adjacent to the ferrule. The method also comprises reflecting the laser beam with the mirror system to be incident upon at least a partial length of the ferrule to thermally cure the bonding agent through the ferrule to secure the optical fiber to the ferrule. The at least a partial length of the ferrule extends within the fiber optic connector housing. In this manner, manufacturing time is reduced as the temperature-sensitive bonding material may be heated rapidly yet uniformly or substantially uniformly.

An additional embodiment of the disclosure relates to an apparatus for securing an optical fiber to a ferrule that is at least partially disposed within a fiber optic connector housing. The apparatus comprises a laser configured to emit a laser beam toward a mirror system. The apparatus further comprises a fixture configured to support a ferrule. The ferrule is at least partially disposed within a fiber optic connector housing, and the ferrule encloses an end portion of an optical fiber and a temperature-sensitive bonding agent. The apparatus further comprises the mirror system shaped and orientated to reflect the laser beam to be incident upon at least a partial length of the ferrule to thermally cure the temperature-sensitive bonding agent and thereby secure the optical fiber to the ferrule. The at least the partial length of the ferrule extends within the fiber optic connector housing. In this manner, the optical fiber is secured to the ferrule without damaging the fiber optic connector housing.

An additional embodiment of the disclosure relates to a mirror system for securing an optical fiber to a ferrule by thermal securing of a bonding agent through the ferrule is disclosed. The mirror system comprises an annular mirror disposed to receive a laser beam deflected from a center mirror. The mirror system also comprises the center mirror comprising a conical-shaped reflective surface. The center mirror is shaped and disposed to receive the laser beam directed parallel with an optical axis of a ferrule, and to reflect the laser beam to diverge from the optical axis of the ferrule to be incident upon the annular mirror. The annular mirror is shaped and disposed to reflect the laser beam from the center mirror to converge upon at least a partial length of the ferrule to facilitate uniform or substantially uniform energy absorption of the laser beam along the optical axis of the ferrule and within the at least a partial length. In this manner, the optical fiber may be more readily secured to the ferrule by thermally securing the bonding agent.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIGS. 3A-3C are a perspective view, a cutaway side view, and a front view, respectively, of the ferrule depicted in FIG. 1A, illustrating the at least a partial length of the ferrule where the laser beam is to be incident to thermally cure the bonding agent therein by heating the ferrule;

FIGS. 4A-4D are a front perspective view, cutaway view, front view, and rear view, respectively, of the exemplary mirror system of FIG. 1B, illustrating reflecting the laser beam to be incident on the at least a partial length of the ferrule to provide energy to thermally cure the bonding agent contained within the ferrule bore of the ferrule;

FIG. 11 is a cutaway view of both the exemplary fiber optic connector sub-assembly of FIG. 1A and another exemplary embodiment of a mirror system comprising an annular mirror shaped and disposed to deflect two exemplary light rays of a laser beam onto at least a partial length of the ferrule, illustrating the mirror system comprising an annular mirror at least partially within the fiber optic connector housing;

FIG. 12A is a cross-sectional view of an example of the laser beam of FIG. 11, provided in a ring-shaped laser beam as the laser beam is emitted toward the annular mirror instead of directly incident upon the ferrule from the laser;

FIG. 12B is a cross-sectional view of an alternative example of the laser beam of FIG. 11, depicting at least one laser spot moving around the optical axis of the ferrule as the laser beam is emitted toward the annular mirror instead of directly incident upon the ferrule from the laser;

FIGS. 18A-18D are a front perspective view, side cutaway view along the optical axis, front view, and rear view, respectively, of the mirror system comprising the combination annular mirror of FIG. 17.

DETAILED DESCRIPTION

Figure 1A:
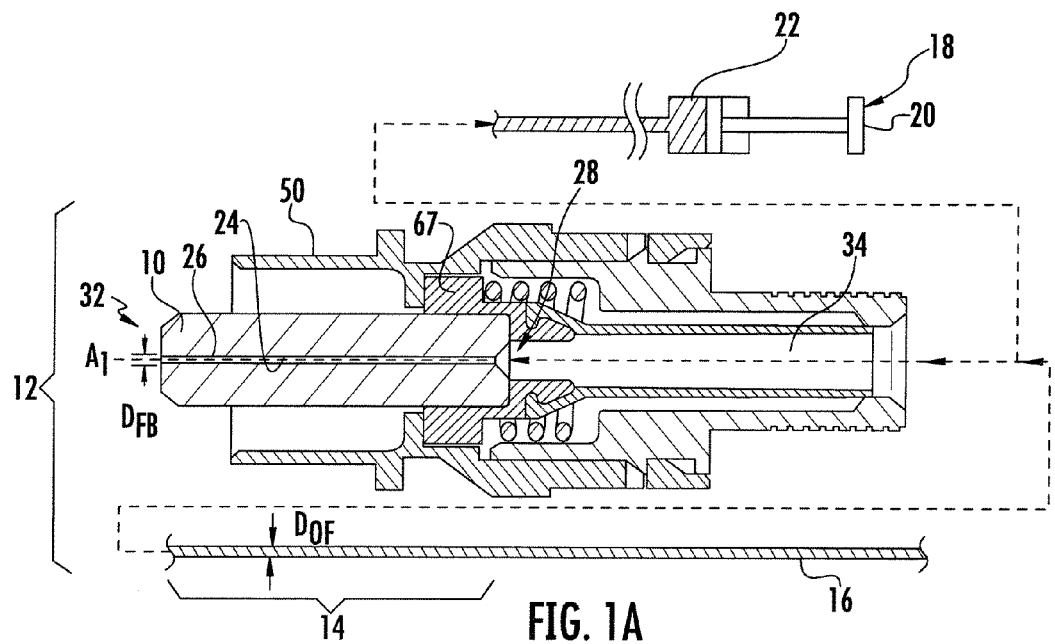
FIG. 1A is a cutaway view along an optical axis of a ferrule partially recessed within a fiber optic connector housing as part of an exemplary fiber optic connector sub-assembly, an optical fiber detached from the ferrule, and an insertion device adjacent the fiber optic connector sub-assembly to illustrate disposing the bonding agent and optical fiber within a ferrule bore of the ferrule before thermal securing to secure the optical fiber to the ferrule.

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include mirror systems securing optical fibers to ferrules by thermally securing bonding agents within fiber optic connector housings. Related methods and assemblies are also disclosed. A fiber optic connector includes an optical fiber secured within a ferrule by a temperature-sensitive bonding agent to prevent attenuation-causing movement. The bonding agent is activated by heat provided by laser energy incident upon the ferrule, which is at least partially disposed within a fiber optic connector housing and which may be damaged by the laser energy. By shaping and disposing at least one mirror of a mirror system, the laser energy may be reflected to be incident upon the ferrule in a controllable intensity distribution. In this manner, the laser energy may be absorbed uniformly or substantially uniformly along a partial length of the ferrule extending into the housing to accelerate securing of the bonding agent while avoiding damage to the housing.

With regard to securing an end portion of an optical fiber within a ferrule bore of a ferrule, it has been discovered that a bonding agent, when sufficiently activated along at least a partial length of the ferrule bore, may be used to provide mechanical strength needed to minimize attenuation caused by movement of the optical fiber within the ferrule. The bonding agent may be activated over the at least a partial length of the ferrule bore when heated above a securing temperature along the at least a partial length to allow securing to occur. The partial length of the ferrule bore containing the bonding agent may be heated above this elevated temperature by energy from a laser beam reflected by a mirror system to be incident upon the at least a partial length of the ferrule. The energy is at least partially absorbed near an external surface of the ferrule where it propagates as heat to the ferrule bore, where the energy heats the bonding agent to the securing temperature so that securing may occur. The mirror system may include mirrors shaped and disposed to distribute the energy from the laser along the at least a partial length of the ferrule. In this manner, the energy may be absorbed uniformly or substantially uniformly along the at least partial length so that thermal-gradient induced stresses are minimized in the bonding agent during securing. Better control of the uniformity or substantially uniformity of the bonding agent drying and bonding is thereby achieved in both the longitudinal and circumferential directions with respect to the ferrule.

Also, the laser beam may be reflected by the mirror system along the circumference of the ferrule to maximize heat flow from the incident laser beam to the ferrule bore, where the bonding agent will be activated. The mirror system is configured to reflect the laser beam so that the laser beam is incident upon the at least a partial length of the ferrule while avoiding direct incidence of the laser beam upon the fiber optic connector housing, which is at least partially disposed around the ferrule. Specifically, the mirror system reflects the laser beam within a gap, which is relatively narrow having a minimum gap width $L_G$, for example, a few millimeters, between the ferrule and the fiber optic connector housing, to be incident upon the ferrule. In this manner, the bonding agent is activated sufficiently to secure the end portion of the optical fiber without allowing axial movement of the end portion along the optical axis of the ferrule as the optical fiber is subject to axial forces during connections and disconnections as part of a fiber optic connector. Accordingly, attenuation-causing movement is minimized while damage to the fiber optic connector housing is avoided.

Figure 14A:
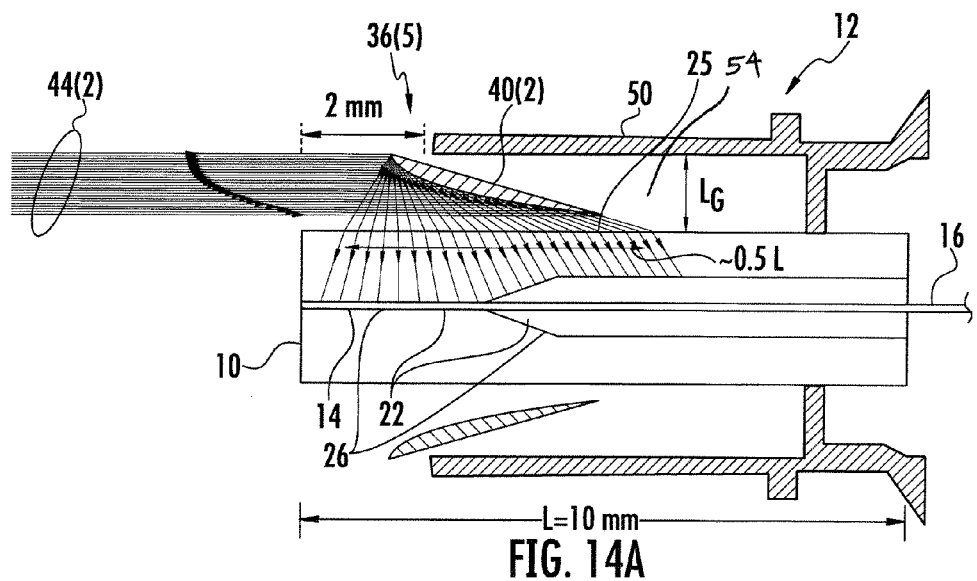
FIG. 14A is a schematic diagram of the fiber optic connector sub-assembly and the mirror system of FIG. 11, illustrating dimensional relationships of the mirror system and the ferrule to the light rays of the laser beam.
Figure 14B:
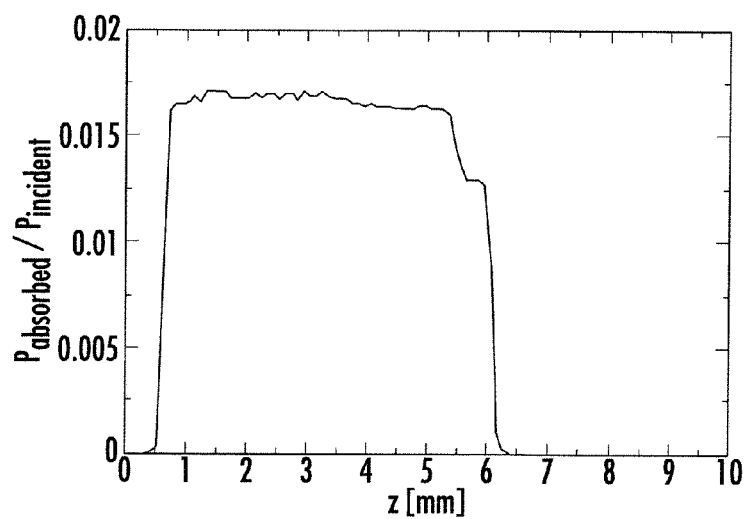
FIG. 14B is a chart of an absorption of energy of the laser beam as a function of longitudinal position along the ferrule of FIG. 14A.

In this regard, this disclosure is organized in sections. First, FIGS. 1A and 1B will be utilized to introduce the concept of reflecting a laser beam with a mirror system to be incident upon the ferrule to thermally heat the bonding agent through the ferrule while avoiding direct incidence of the laser beam upon the fiber optic connector housing, where damage may occur. Next, a flowchart in FIG. 2 is discussed as part of an exemplary method for securing an optical fiber to a ferrule that is at least partially disposed within a fiber optic connector housing in relation to related method and component details depicted in FIGS. 3A through 10. Finally, FIG. 11 will be discussed to introduce another embodiment of the mirror system, in conjunction with FIGS. 12A-13D, to explain details of the mirror system and laser beam, while FIGS. 14A-14B provide calculation results relative to the mirror system depicted in FIG. 12.

Figure 2:
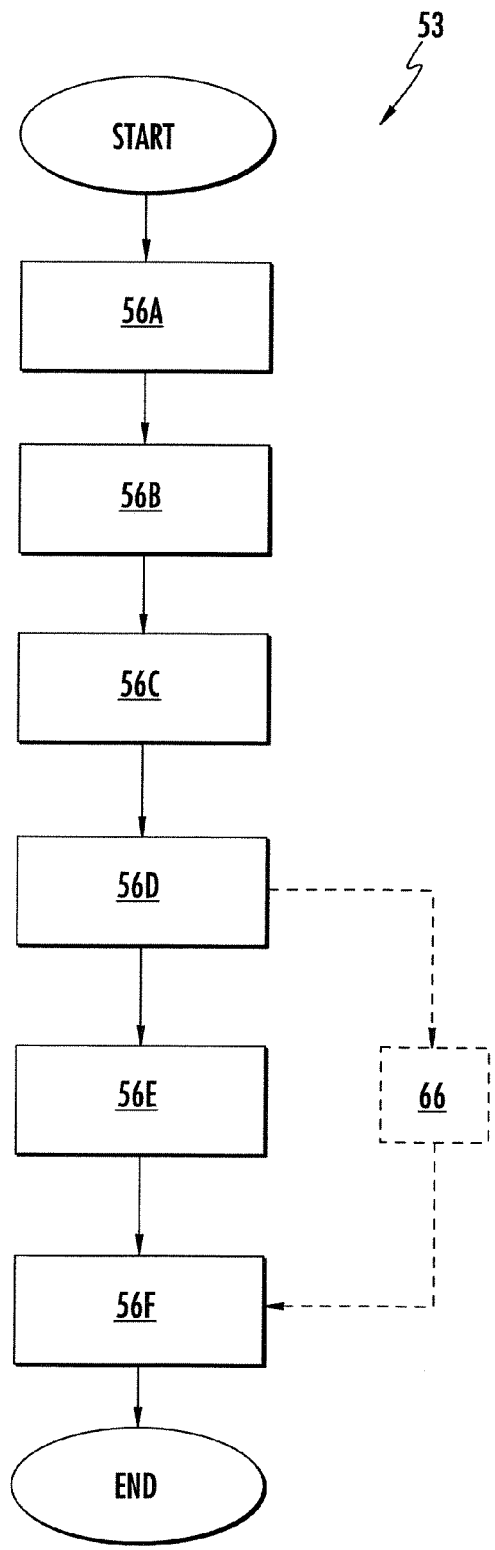
FIG. 2 is a flowchart illustrating an exemplary method for securing the optical fiber to the ferrule, which is at least partially disposed within the fiber optic connector housing of FIG. 1B, by thermally securing the bonding agent within the fiber optic connector housing.

In this regard, FIG. 1A is a cutaway view along an optical axis $A_1$ of a ferrule 10 of an exemplary fiber optic connector sub-assembly 12 being prepared to be secured to an end portion 14 of an optical fiber 16, but depicted adjacent and unsecured as part of the fiber optic connector sub-assembly 12. An exemplary insertion device 18, for example a syringe 20, is adjacent to the exemplary fiber optic connector sub-assembly 12. The insertion device 18 contains a bonding agent 22 to be used to secure the optical fiber to the ferrule 10 after thermal securing.

Specifically, the ferrule 10 comprises an inner surface 24 forming a ferrule bore 26 extending through the ferrule 10 from the rear end 28 to the front end 32 of the ferrule 10. The ferrule bore 26 will be used to precisely position the end portion 14 of the optical fiber 16 for establishing optical connections with other optical devices (not shown). The insertion device 18 may be inserted through the inner passageway 34 of the fiber optic connector sub-assembly 12 to dispose at least a portion of the bonding agent 22 within the ferrule bore 26. The end portion 14 of the optical fiber 16 may also be placed in the ferrule bore 26 with the bonding agent 22, which still remains activated (e.g., uncured).

Figure 1B:
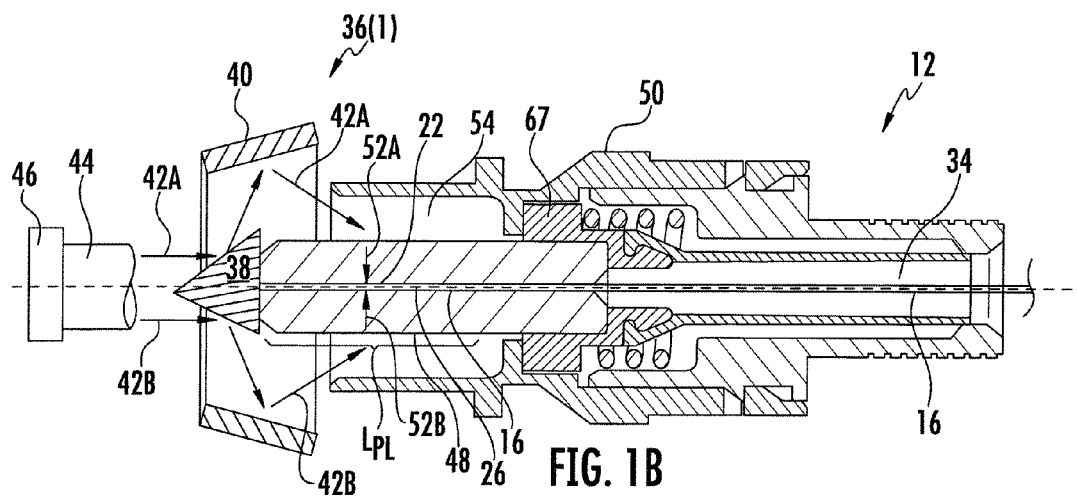
FIG. 1B is a cutaway view of the exemplary fiber optic connector sub-assembly of FIG. 1A disposed adjacent to an exemplary mirror system and a laser emitting a laser beam, and illustrating the mirror system shaped and disposed to deflect two exemplary light rays of the laser beam onto at least a partial length of the ferrule, to heat the ferrule and thereby cure the bonding agent therein to secure the optical fiber to the ferrule.

FIG. 1B depicts the exemplary fiber optic connector sub-assembly 12 of FIG. 1A, wherein the bonding agent 22 is activated by being thermally cured as a non-limiting example to thereby secure the end portion 14 of the optical fiber 16 to the ferrule 10. A mirror system 36(1) has been disposed proximate to the ferrule 10. In the embodiment shown in FIG. 1B, the mirror system 36(1) may contain a center mirror 38 and an annular mirror 40. The mirror system 36(1) receives exemplary light rays 42A, 42B of a laser beam 44 emitted by a laser 46. The mirror system 36(1) reflects the laser beam 44 to be incident upon at least a partial length 48 of the ferrule 10.

At the at least a partial length 48 of the ferrule 10 where the laser beam 44 is incident, a portion 52A, 52B of a laser energy of the laser beam 44 is absorbed by the ferrule 10 and travels by heat transfer to the ferrule bore 26 to elevate a temperature of the bonding agent 22. The at least a partial length 48 is disposed at least partially within a fiber optic connector housing 50 of the fiber optic connector sub-assembly 12 in order to provide energy to raise the temperature for a sufficient amount of the bonding agent 22 to activate (e.g., cure), thereby preventing the end portion 14 of the optical fiber 16 from movement within the ferrule bore 26. Accordingly, the laser beam 44 is reflected through a gap 54 disposed between the fiber optic connector housing 50 and the ferrule 10 to irradiate fully the at least a partial length 48 of the ferrule 10.

As the temperature of the bonding agent 22 is raised by the portion 52A, 52B of a laser energy of the laser beam 44, the bonding agent 22 begins to activated (e.g., cure) above a certain securing temperature specific to the bonding agent 22. Securing may be a chemical process wherein the bonding agent 22 forms cross-linked thermoset structures, thus enabling secure bonds to be created between proximate objects, for example between the ferrule 10 and the end portion 14 of the optical fiber 16. In this regard, when the bonding agent 22 activates within the ferrule bore 26 in the at least a partial length 48 of the ferrule 10, then the optical fiber 16 may be secured to the ferrule 10. It is also noted that in some embodiments the bonding agent 22 may comprise, for example, thermoplastics and/or inorganics which may be heated to the securing temperature enabling secure bonds to be created between the ferrule 10 and the end portion 14 of the optical fiber 16.

With continued reference to FIG. 1B, it is noted that the mirror system 36(1) precisely reflects the laser beam 44 to be directly incident upon the ferrule 10 instead of the fiber optic connector housing 50, thus avoiding damage to the fiber optic connector housing 50. In this manner, damage to the fiber optic connector housing 50 may be avoided; yet the optical fiber 16 is secured to the ferrule 10.

The optical fiber 16, laser beam 44, mirror system 36(1), bonding agent 22, and the ferrule 10 have been introduced, as well as the concept of reflecting the laser beam 44 with the mirror system 36(1) to be incident upon the ferrule 10 to thermally heat the bonding agent 22 through the ferrule 10 while avoiding direct incidence of the laser beam 44 upon the fiber optic connector housing 50, where damage may occur. Now an exemplary method 53 to secure the optical fiber 16 to the ferrule 10, which is at least partially disposed within the fiber optic connector housing 50, is discussed. In this regard, FIG. 2 is a flowchart diagram of the exemplary method 53 of securing the optical fiber 16 to the ferrule 10 that is at least partially disposed within the fiber optic connector housing 50. The flowchart diagram includes blocks 56A-56F and optional block 66. Optional block 66 is depicted in broken (dashed) lines for convenient reference. The terminology and reference characters introduced above will be utilized in the related discussion below for continuity, clarity, and conciseness.

With reference back to FIG. 1A, the bonding agent 22 may be disposed within the ferrule bore 26 of the ferrule 10 (block 56A in FIG. 2). The ferrule bore 26 is formed by the inner surface 24 of the ferrule 10. The bonding agent 22 will secure the end portion 14 of the optical fiber 16 to the inner surface 24 of the ferrule 10.

The ferrule bore 26 may extend through the ferrule 10 from the rear end 28 to the front end 32. The ferrule 10 is at least partially disposed within and supported by the fiber optic connector housing 50. In one embodiment, at least forty (40) percent of the ferrule 10 is disposed within the fiber optic connector housing 50. The fiber optic connector housing 50 provides an interface for the user to connect and disconnect the fiber optic connector sub-assembly 12. The fiber optic connector housing 50 together with the ferrule holder 67 also protects the end portion 14 of the optical fiber 16 once the end portion 14 is installed within the fiber optic connector sub-assembly 12. The fiber optic connector housing 50 also protects the ferrule 10 from lateral impacts, which could damage the fiber optic connector sub-assembly 12. Accordingly, the fiber optic connector housing 50 may be made of a strong material, for example, a plastic such as high-density polyethylene (HDPE) or polyether block amide (PEBA). Accordingly, the fiber optic connector housing 50 is not designed to experience relatively high temperatures, for example, above one-hundred twenty-five (125) degrees Celsius. It is noted that temperatures above one-hundred twenty-five (125) degrees Celsius are associated with the securing temperature of at least one embodiment of the bonding agent 22.

The insertion device 18 may be used to dispose the bonding agent 22 into the ferrule bore 26 of the ferrule 10. The bonding agent 22 may be inserted into the ferrule bore 26 in the same direction as the end portion 14 of the optical fiber 16 is inserted into the ferrule bore 26. In this way, the optical fiber 16 may pull or entrain the bonding agent 22 through the ferrule bore 26 to ensure there is relative uniform or substantially uniform distribution of the bonding agent 22 through the ferrule bore 26. The end portion 14 of the optical fiber 16 is cleaved at the front end 32 of the ferrule 10; thus the optical fiber 16 may be inserted through the ferrule bore 26 of the ferrule 10 from the rear end 28 to the front end 32. Accordingly, the insertion device 18, which in one embodiment may be a syringe 20, may be inserted carefully through the inner passageway 34 of the fiber optic connector housing 50 to the rear end 28 of the ferrule 10 where the bonding agent 22 may be inserted into the ferrule bore 26.

With continued reference to block 56A of FIG. 2, the bonding agent 22 may be in liquid, powder, or gel form when disposed into the ferrule bore 26, to make disposition into the ferrule bore 26 efficient. The bonding agent 22 may be an adhesive or cohesive compatible with materials used for the ferrule 10 and the optical fiber 16, while providing sufficient strength to prevent movement of the optical fiber 16 in the ferrule bore 26 after being activated (e.g., cured). In one embodiment, the bonding agent 22 may be an epoxy resin requiring heat to be elevated to a securing temperature in order to provide the mechanical bonding properties to prevent movement of the optical fiber 16 within the ferrule bore 26. In some examples, the securing temperature for the bonding agent 22 may be above one-hundred twenty-five (125) degrees Celsius, and may be as high as four-hundred (400) degrees Celsius. Insufficient heat to elevate the temperature of the bonding agent 22 to the securing temperature may result in insufficient bonding, thus the bonding agent 22 may not provide sufficient strength to prevent movement of the optical fiber 16 within the ferrule bore 26. In this manner, the end portion 14 of the optical fiber 16 may not be located precisely to the ferrule 10 and attenuation may occur. It is noted that the maximum strength provided by the bonding agent 22 may occur when the bonding agent 22 reaches a glass transition temperature of the bonding agent 22 when fully activated (e.g., cured).

With continued reference back to FIG. 1A, the end portion 14 of the optical fiber 16 is disposed in ferrule bore 26 (block 56B in FIG. 2). The end portion 14 of the optical fiber 16 may have a diameter $D_{OF}$ which is less than the diameter $D_{FB}$ of the ferrule bore 26. In one embodiment, the diameter $D_{OF}$ is within one (1) micron of the diameter $D_{FB}$. In this manner, the inner surface 24 of the ferrule 10 may precisely hold the end portion 14 of the optical fiber 16 within the ferrule bore 26 and provide close proximity between the two (2) objects, so that the end portion 14 of the optical fiber 16 and the inner surface 24 of the ferrule 10 may be more easily secured by the bonding agent 22.

With reference back to FIG. 1B, the mirror system 36(1) may be shaped and orientated to reflect the laser beam 44 to be incident upon the at least the partial length 48 of the ferrule 10 (block 56C in FIG. 2). Shaping and orientating the mirror system 36(1) is relatively complex and depends on many factors including an intensity profile, shape, and propagation direction of the laser beam 44, as received by the mirror system 36(1). Other relevant factors include an intended trajectory and intensity of the laser beam 44 as reflected by the mirror system 36(1), and the partial length 48 of the ferrule 10 wherein the laser beam 44 is to be incident to secure the optical fiber 16 to the ferrule 10.

Working backwards through the factors, the at least a partial length 48 is now discussed. In this regard, FIGS. 3A-3C are a perspective view, cutaway side view, and a front view, respectively, of the ferrule 10 depicted in FIG. 1A, and illustrating the at least a partial length 48 of the ferrule 10 where the laser beam 44 is to be incident. The at least a partial length 48 may be cylindrically shaped covering a length $L_{PL}$ of the ferrule 10 extending from the front end 32 of the ferrule 10. As shown in FIG. 3C, the at least a partial length 48 may cover the circumference of the ferrule 10, thus providing opportunities for heat to travel in multiple radial directions to heat the bonding agent 22 within the ferrule bore 26. Accordingly, the incident energy from the laser beam 44 around the circumference will more efficiently heat the ferrule 10, and thereby a lower energy intensity of the laser beam 44 may be used to avoid damage to the fiber optic connector housing 50.

Another factor to determine the shape and orientation of the mirror system 36(1) is the trajectory and intensity of the laser beam 44. FIGS. 4A-4D are a front perspective view, cutaway view, front view, and rear view, respectively, of the exemplary mirror system of FIG. 1B concentric to a center axis $A_2$ of the mirror system 36(1). The mirror system 36(1) comprises the annular mirror 40 disposed to receive the laser beam 44 deflected (FIG. 1B) from the center mirror 38. The mirror system 36(1) also comprises the center mirror 38 comprising a conical-shaped reflective surface 58. As shown in FIG. 1B, the center mirror 38 is shaped and disposed to receive the laser beam 44 directed parallel with the optical axis $A_1$ of the ferrule 10 and to reflect the laser beam 44 to diverge in a trajectory to be directed incident upon the annular mirror 40. In this manner, the laser beam 44, when reflected from the annular mirror 40, may be incident upon the circumference of the ferrule 10 and within the at least a partial length 48.

The mirror system 36(1) also comprises at least one holder member 59. The holder member 59 connects the center mirror 38 and the annular mirror 40 together. The holder member 59 may be formed from a material that may be relatively transmissive to the laser beam 44. For example, the holder member 59 may be formed of the material comprising zinc selenide which is highly transparent for an exemplary wavelength of 9.6 microns for the laser beam 44. Calculations indicate that if three (3) holder members 59 were used for the mirror system 36(1), wherein each of the three holder members 59 had a thickness of 0.25 millimeters, then only five (5) percent of the total power of the laser would be absorbed by the holder members 59. In this manner, the center mirror 38 and the annular mirror 40 may be fixed relative to each other with the holder member 59 providing minimum power loss.

Materials used for the center mirror 38 and the annular mirror 40 may be selected for efficiency to minimize loss. For example, silver, aluminum, or copper may be used for the materials for the center mirror 38 and the annular mirror 40. In this manner, the energy required to be emitted by the laser 46 may be minimized.

Figure 5A:
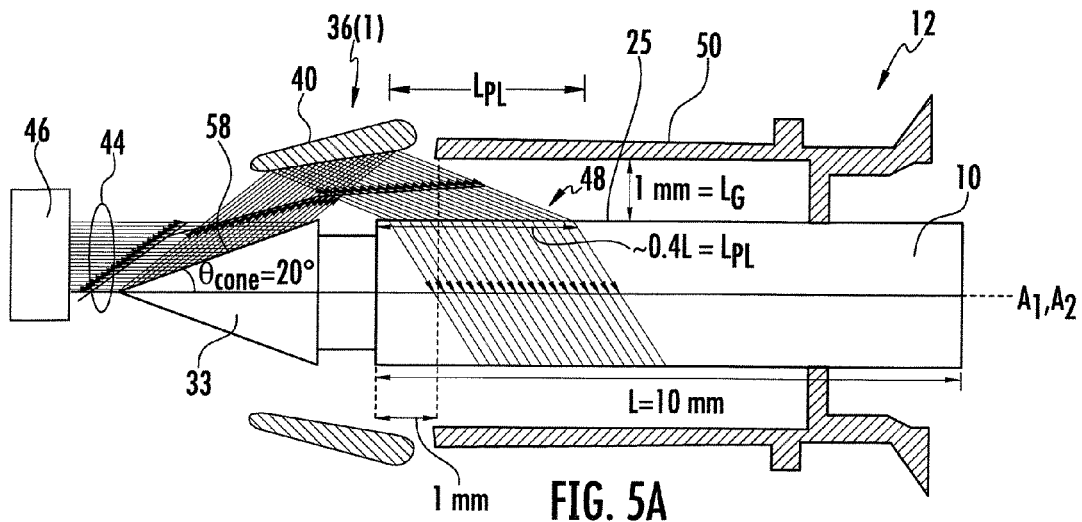
FIG. 5A is a schematic diagram of an exemplary fiber optic connector sub-assembly and the mirror system of FIG. 1B, illustrating the mirror system reflecting energy from the laser beam which is uniformly or substantially uniformly absorbed upon the at least a partial length of the ferrule.

FIG. 5A is a schematic diagram of the fiber optic connector sub-assembly 12 of the mirror system 36(1) of FIG. 1B, illustrating exemplary angular and spatial relationships of the mirror system 36(1) and the ferrule 10 relative to light rays of the laser beam 44. As seen in FIG. 5A, the laser beam 44 may be emitted parallel to the optical axis $A_1$ of the ferrule 10. The laser beam 44 may be received by the center mirror 38 having the conical-shaped reflective surface 58 angled at an angle $\theta_{cone}$ relative to the center axis $A_2$ of the mirror system 36(1). The angle $\theta_{cone}$ may be, for example, twenty (20) degrees. In this manner, the center mirror 38 may be configured to reflect the laser beam 44 upon the annular mirror 40.

Figure 5B:
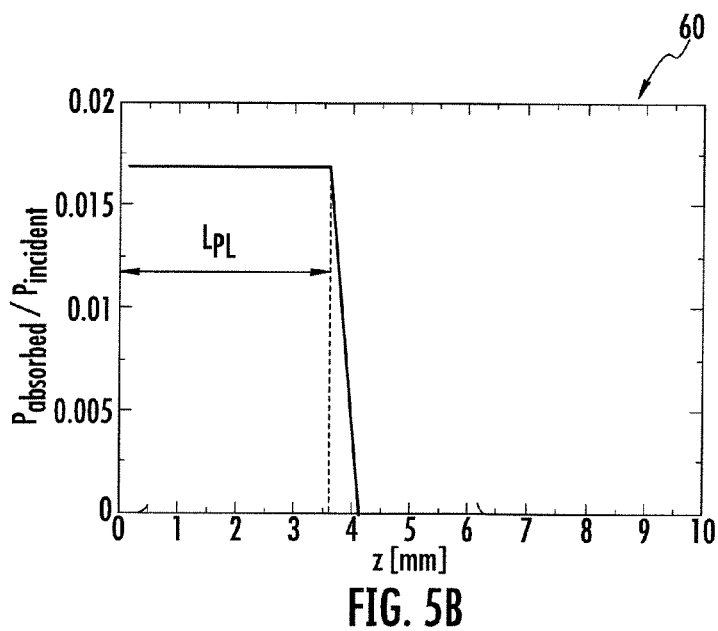
FIG. 5B is an exemplary chart of an absorption of energy of the laser beam by the ferrule versus longitudinal positions along the ferrule of FIG. 5A, illustrating that the mirror system may be shaped and disposed to provide uniform or substantially uniform absorption of the laser beam within the at least a partial length of the ferrule.

The annular mirror 40 may be shaped to provide uniform or substantially uniform absorption of the laser beam 44 incident within the at least a partial length 48. FIG. 5B is an exemplary chart 60 of an absorption of energy of the laser beam 44 by the ferrule 10 as a function of longitudinal position along the ferrule 10 of FIG. 2A. As shown in chart 60, the absorbed energy of the laser beam 44 is uniform or substantially uniform along the at least a partial length 48.

With reference back to FIG. 5A, it is noted that the annular mirror 40 is shaped and disposed relative to the fiber optic connector housing 50 to avoid reflecting the laser beam 44 to be directly incident upon the fiber optic connector housing 50. Instead, the annular mirror 40 is shaped and disposed to reflect the laser beam 44 directly upon the ferrule 10 and a portion of the laser beam 44 is reflected through the gap 54 disposed between the ferrule 10 and the fiber optic connector housing 50, to be incident upon the at least a partial length 48 within the fiber optic connector housing 50. In this way, the bonding agent 22 within a sufficient length $L_{PL}$ of the ferrule 10 may be thermally activated by being thermally cured through the ferrule 10 to secure the optical fiber 16 to the inner surface 24 of the ferrule 10.

Figure 5C:
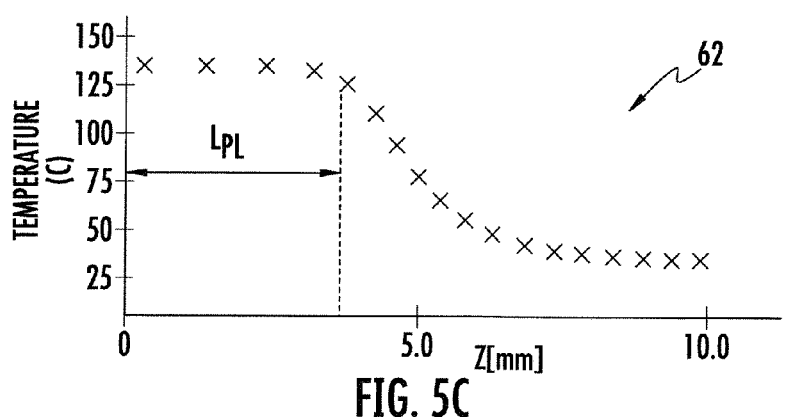
FIG. 5C is an exemplary chart of temperature calculations at longitudinal positions of the ferrule of FIG. 5A subject to the absorbed energy of FIG. 5B.

FIG. 5C is an exemplary chart 62 of temperature calculations at longitudinal positions of the ferrule 10 of FIG. 5A. As can be observed in the chart 62, the temperature of the ferrule 10 may be uniform or substantially uniform within the at least a partial length 48. In this manner, the ferrule 10 may be heated efficiently within the at least a partial length 48 to heat the bonding agent 22, thus causing thermal securing and securing the optical fiber 16 to the ferrule 10. It is noted that the intensity of the laser beam 44 may be increased or decreased to change the temperature of the ferrule 10, and thereby the temperature of the bonding agent 22.

Figure 6:
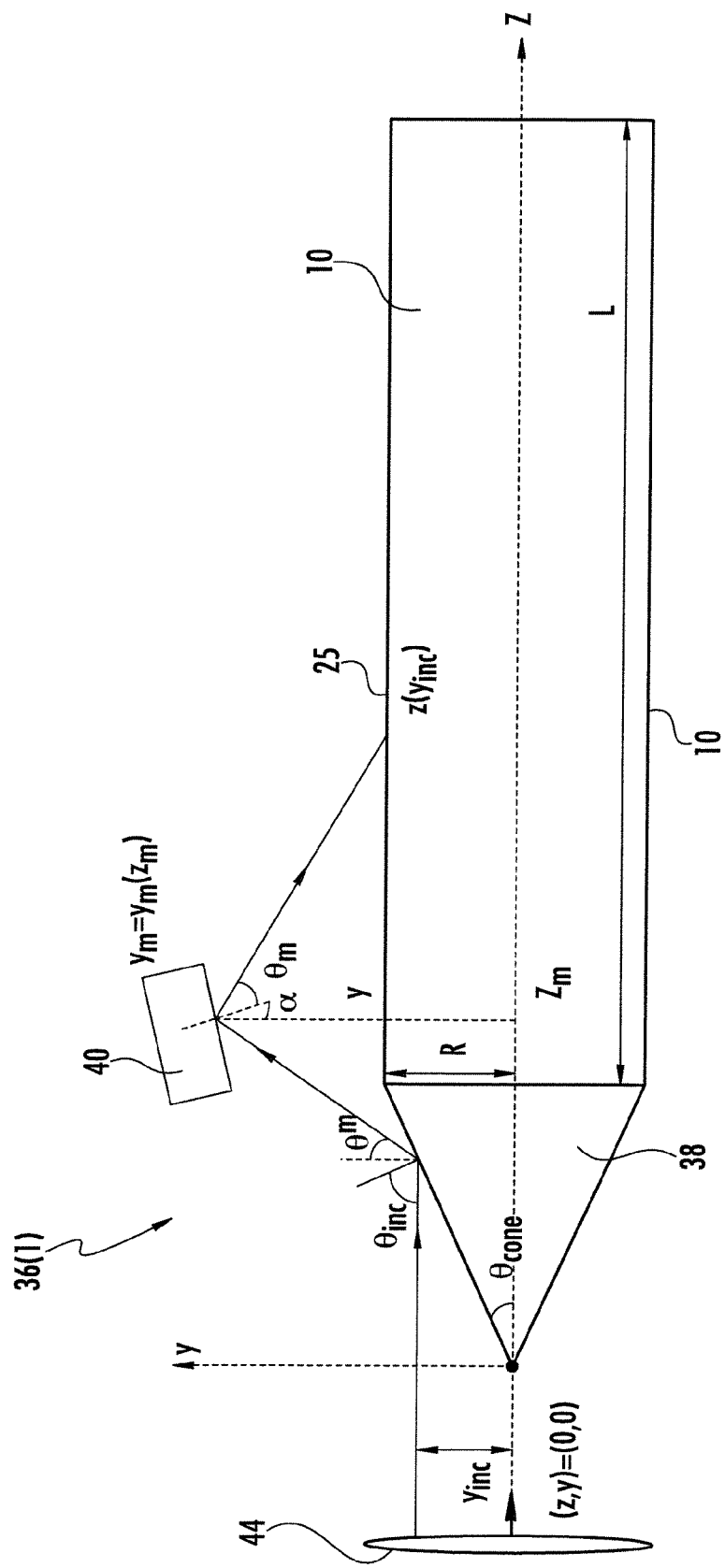
FIG. 6 is a schematic view of a summary of angular and dimensional relationships used to calculate the shape and orientation of the mirror system of FIG. 1B.

FIG. 6 is a schematic view of a summary of angles used to calculate incidence angles upon the mirror system 36(1) and the ferrule 10. Due to the symmetry of the laser beam 44, mirror system 36(1), and the ferrule 10, the laser beam 44 reflected from the annular mirror 40 will have a uniform or substantially uniform distribution around the optical axis $A_1$ of the ferrule 10 at any longitudinal position (along the z-axis). With continued reference to FIG. 6, the following relations for the angles can be defined:

$\theta_{inc} = \pi/2 - \theta_{cone}$ $\theta^m_{inc} = \theta_{inc} - \theta_{cone}$ $\theta_m = \theta^m_{inc} + \alpha$ $dy_m/dz_m = \tan(\alpha)$ The position of any given light ray of the laser beam 44 on the surface of the ferrule 10 can be computed from the equations that follow directly from the geometry shown in FIG. 6:

$$z_m = \frac{y_{inc}}{\tan\theta_{cone}} + (y_m - y_{inc})\tan(\theta^m_{inc}),$$

$$z(y_{inc}) = z_m + (y_m - R)\tan(\theta^m_{inc} + 2\alpha)$$

With the angle $\alpha$ related to the shape of the annular mirror 40, the above formulas can be re-arranged to provide a differential equation for the annular mirror 40 as a function of the incident ray coordinate, $y_m(y_{inc})$:

$$\frac{dy_m}{dy_{inc}} = A\frac{\tan\alpha}{1 - B\tan\alpha}$$

where $\alpha$, A, B are given by:

$$A = \frac{1}{\tan(\theta_{cone})} - B, \quad B = \tan(\theta^m_{inc}),$$

$$\tan(2\alpha + \theta^m_{inc}) = \frac{z(y_{inc}) - Ay_{inc} - By_m}{y_m - R}$$

For a desired target distribution $z(y_{inc})$ of incident rays along the z-axis on the ferrule 10, the above differential equation can be solved to obtain a shape of the annular mirror 40 required to get the desired intensity distribution. With the optical power being proportional to a quantity of light rays of the laser beam 44 per unit area of the ferrule 10, this approach is seen to provide practical means to control the desired intensity distribution of the laser beam 44 on the ferrule 10 along the z-axis by varying the shape of the annular mirror 40. Computations may be performed using the commercial ray-tracing software Zemax® available from Radiant Zemax, LLC of Redmond, Wash. Due to the large ratio of a beam size to the wavelength ($R/\lambda_0$ of approximately one-hundred), large Rayleigh range, and macroscopic size of optically smooth reflecting surfaces, the ray-tracing approximation is expected to provide an accurate estimate of the power absorbed in the ferrule 10.

Figure 7A:
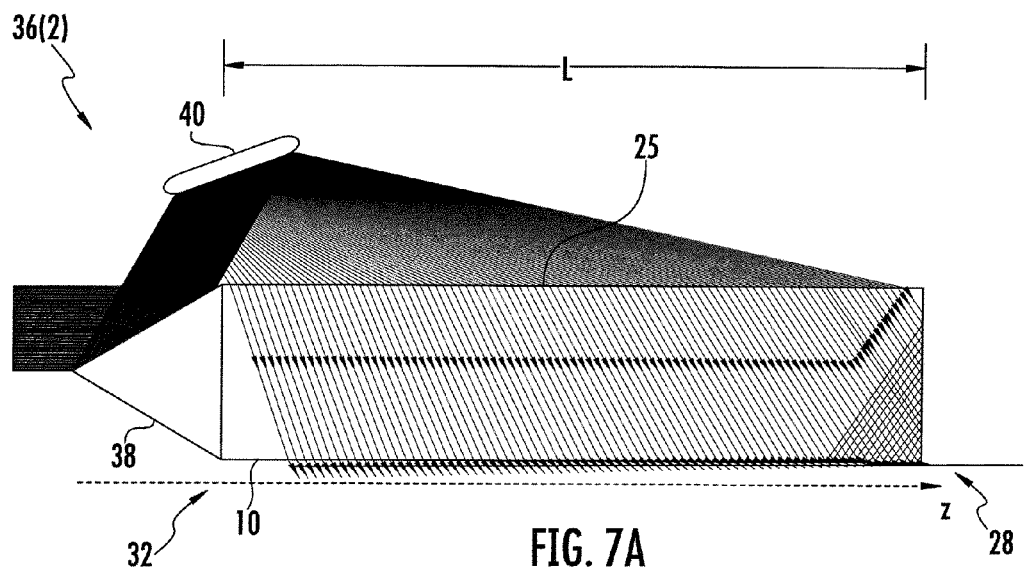
FIG. 7A is a schematic diagram of an exemplary embodiment of the mirror system of FIG. 1B reflecting energy from the laser beam to be uniformly or substantially uniformly incident upon a length of the ferrule depicted in FIG. 1A, as illustrated by a uniform or substantially uniform distribution of light rays from a laser beam without regard to the fiber optic connector housing.
Figure 7B:
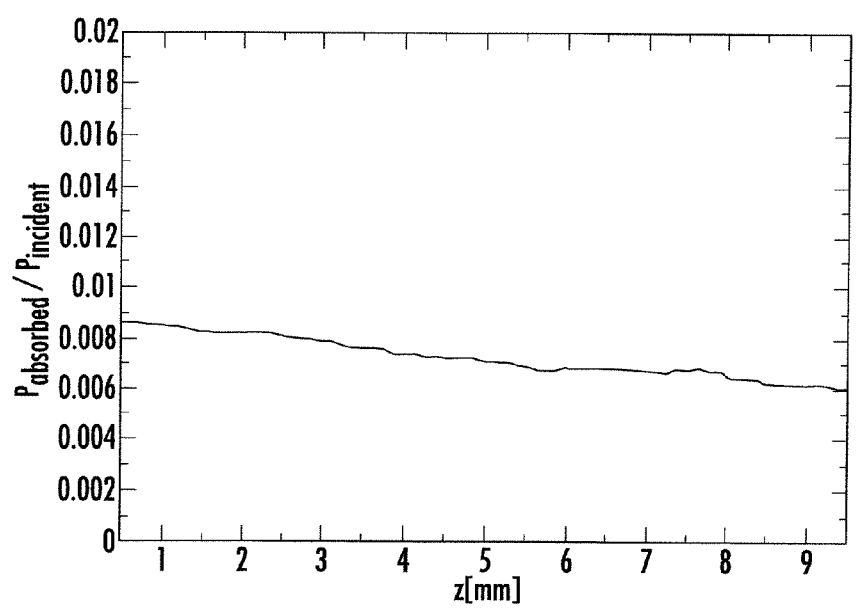
FIG. 7B is a chart of an absorption of energy of the laser beam as a function of longitudinal position along the ferrule of FIG. 7A, illustrating a decreasing absorption of the energy that is incident upon the ferrule at increasingly higher incident angles towards a rear end of the ferrule.

FIG. 7A shows the results of ray-tracing simulations with one embodiment of a mirror system 36(2) having a design of the annular mirror 40 corresponding to a target function for a uniform or substantially uniform ray density on an outer surface 25 of the ferrule 10, along its entire length L:

$$L = 10 \text{ mm}, R = 1.25 \text{ mm}, \theta_{cone} = 30°,$$

$$z(y_{inc}) = \frac{R}{\tan\theta_{cone}} + y_{inc}\left(\frac{L}{R}\right),$$

$$y_m(y_{inc} = 0) = \left(\frac{R}{\tan\theta_{cone}} + RB\right) \Big/ (2B)$$

In FIG. 7A, the light rays have a uniform or substantially uniform density on the surface of the ferrule 10, as designed. While the light rays are also shown as propagating throughout a volume of the ferrule 10, inside the ferrule 10 the intensity of each ray is reduced due to the absorption and conversion of the laser light into thermal energy. The complex-valued optical permittivity of bulk c-$ZrO_2$, of which the ferrule 10 may be comprised, is available for calculations. At a carbon dioxide laser wavelength of $\lambda_0$=9.3 microns for the laser beam 44, the permittivity of c-$ZrO_2$ is $\epsilon$=2.9+0.036i, and the optical absorption coefficient $4\pi k/\lambda_0$ indicates complete absorption of the incident light within approximately two-hundred (200) to three-hundred (300) microns of an external surface of the ferrule 10. Hence, for modeling the thermal transport in the ferrule 10, the incident energy can be considered as being deposited in the two-hundred (200) to three-hundred (300) microns deep skin-layer volume. The absorbed energy dependence on the z-coordinate can be seen from FIG. 7B. The reduction of the absorbed power with increasing z is due to an increasing angle of incidence and associated increase in the polarization averaged reflectivity of the surface of the ferrule 10. The small fluctuations seen in the absorption profiles are due to the finite number of rays used in the ray-tracing simulations and discrete representation of the surface of the annular mirror 40. These variations become negligible as the number of rays and discretization points is increased.

Figure 8A:
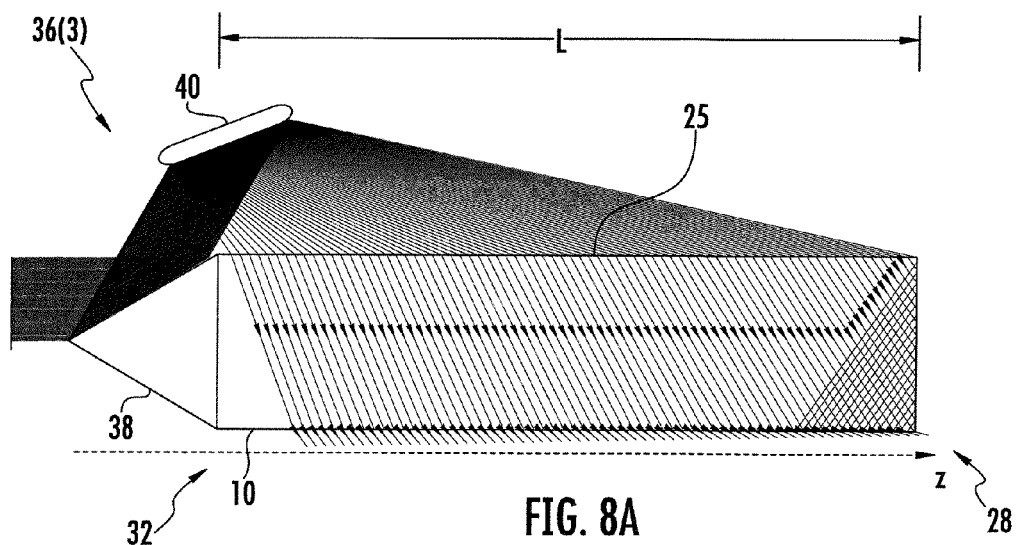
FIG. 8A is a schematic diagram of another exemplary embodiment of the mirror system of FIG. 1B that is shaped and orientated to reflect energy with an intensity distribution to increase the incident energy on the rear end of the ferrule, to compensate for a loss of energy absorbed at the rear end of the ferrule due to higher reflection rates from the ferrule resulting from higher incidence angles.
Figure 8B:
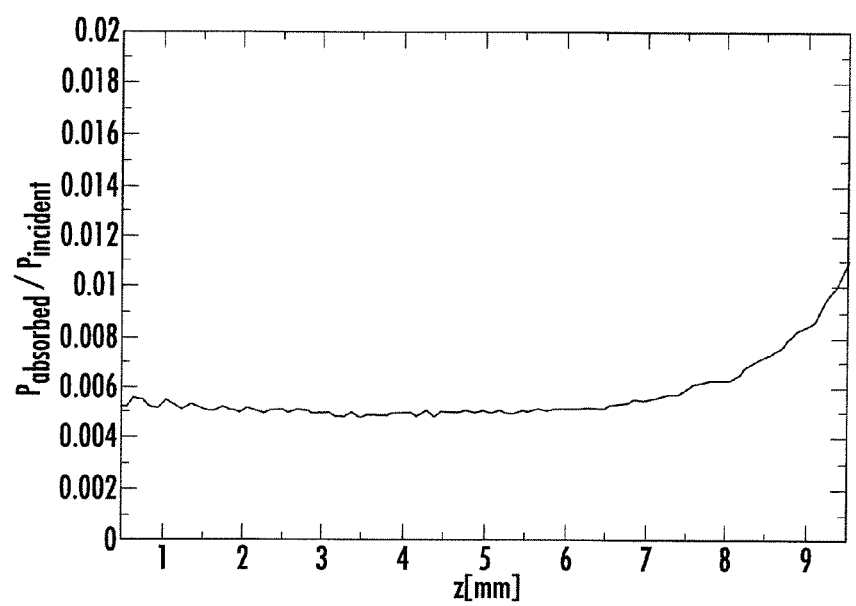
FIG. 8B is a chart of an absorption of energy of the laser beam as a function of longitudinal position along the ferrule of FIG. 8A, illustrating an increasing absorption of the energy at the rear end of the ferrule.

FIG. 8A shows the results computed using the same parameters as in FIG. 7A, but utilizing a mirror system 36(3) which comprises a different embodiment of an annular mirror 40 with a different design, corresponding to a target function with a non-uniform intensity distribution that increases as a function of the z-coordinate:

$$z(y_{inc}) = \frac{R}{\tan\theta_{cone}} + L\sin\left(\frac{y_{inc}}{R}\frac{\pi}{2}\right)$$

The increasing intensity distribution is seen to counteract the decrease in the absorbed power due to the increasing reflectivity at high incidence angles upon the ferrule 10, resulting in an absorbed energy profile (FIG. 8B) that is uniform or substantially uniform everywhere except at very large z-coordinates, where the highest intensity distribution is achieved by design.

Figure 9A:
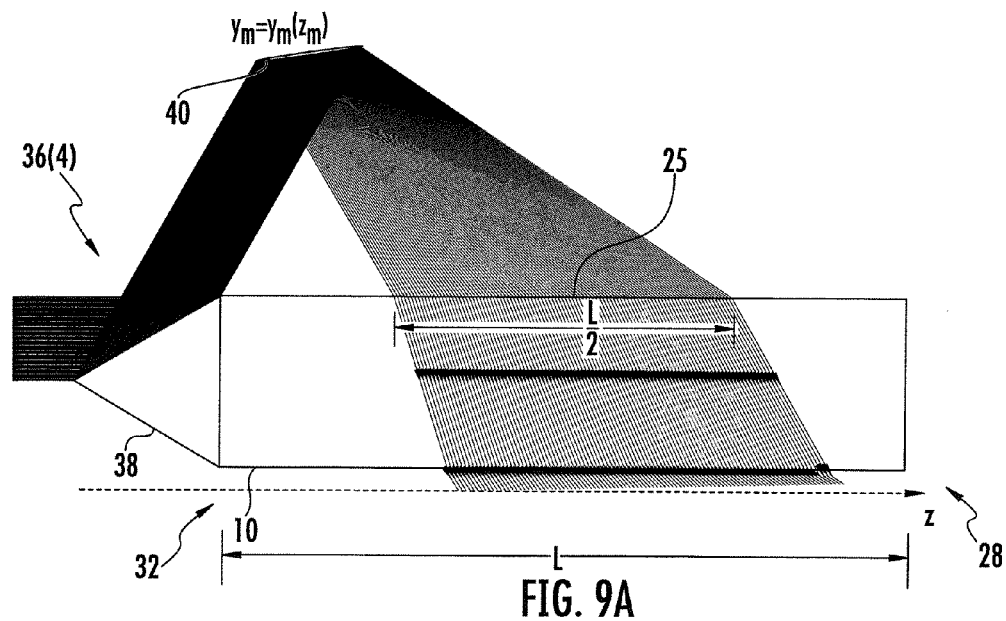
FIG. 9A is a schematic diagram of another exemplary embodiment of the mirror system of FIG. 1B, illustrating reflecting energy from the laser beam in an intensity distribution upon a length of the ferrule to provide uniform or substantially uniform absorption of the energy along the length of the ferrule.
Figure 9B:
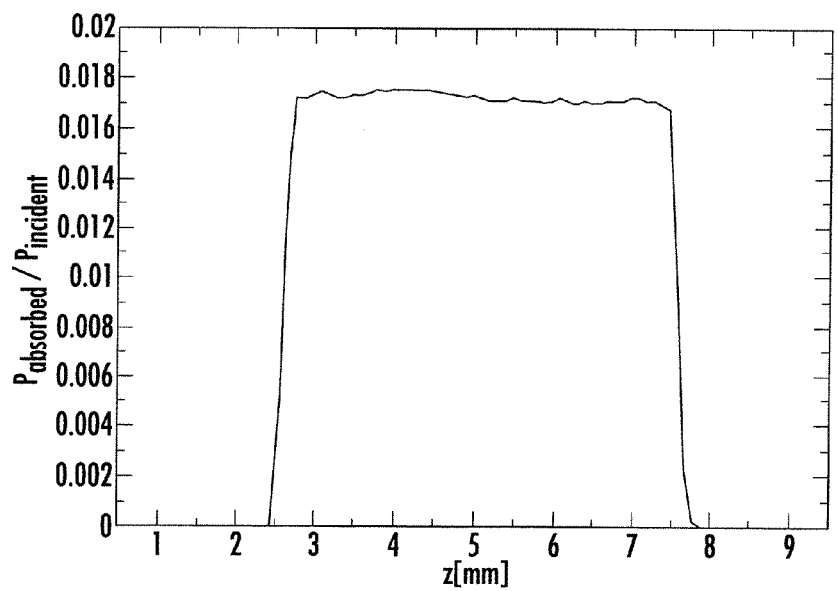
FIG. 9B is a chart of an absorption of energy of the laser beam as a function of longitudinal position along the ferrule of FIG. 9A, illustrating a uniform or substantially uniform absorption of the incident energy of the laser beam along a portion of the length of the ferrule.

FIG. 9A shows the case of a uniform ray density achieved on a section of length L/2 of the ferrule 10 placed at the center of the ferrule 10 with a mirror system 36(4) which is another embodiment of the mirror system 36(3) comprising a different shape of the annular mirror 40, as described by the following target ray density:

$$z(y_{inc}) = \frac{R}{\tan\theta_{cone}} + \frac{L}{4} + y_{inc}\left(\frac{L}{2R}\right)$$

Due to a smaller illuminated area, a higher value of the absorbed power is achieved in this case, along with a smaller variation in the uniformity, due to a limited range of ray incidence angles, compared to the case from FIG. 8A.

To evaluate temperature gradients resulting from the laser light absorption profiles obtained with the proposed mirror system, conductive thermal transport equations are numerically solved for a volume of the ferrule 10, using Comsol® commercial finite-element modeling software provided by Comsol AB of Stockholm, Sweden. The following material properties of a bulk $ZrO_2$ were adopted in the simulations for the ferrule 10, including: a density $\rho$=6000 kg/$m^3$, specific heat capacity $c_p$=400 J/(kg K), thermal conductivity $\kappa$=2 W/(m K). The spatial absorption distribution profiles obtained in optical simulations were used to model the absorbed power density in the 300-micron thin layer at the outer surface 25 of the ferrule 10. The absorbed power density was modulated in time by a 0.33 second FWHM (full width, half maximum) Gaussian pulse centered at time $t_0$ equal to one (1) second. The laser power was adjusted in different cases to obtain a maximum of approximately one-hundred (100) degrees Celsius increase in the temperature inside of the ferrule 10. After an initial transient of approximately two (2) seconds due to the heat conduction from the surface of the ferrule 10 to its center, the temperature distribution becomes radially uniform or substantially uniform with the gradients along the z-axis reflecting the variations due to the non-uniformity in the absorbed power profiles and thermal diffusion.

Temperature profiles of the ferrule 10 calculated for the mirror systems 36(2), 36(3), 36(4), respectively, of FIGS. 7A, 8A, and 9A were different. For the mirror system 36(2) from FIG. 7A, with a uniform or substantially uniform target distribution of the ray density over the entire length L of the ferrule, a drop of about thirty (30) degrees Celsius is computed for the temperature variation from the front end 32 of the ferrule 10 to the rear end 28 of the ferrule 10. The mirror system 36(3) from FIG. 8A, corresponding to a relatively flat profile with an increase in absorption at the rear end 28 of the ferrule 10, shows temperature variation in the opposite direction, with the maximum temperature achieved over a small length span at the rear end 28 of the ferrule 10. The mirror system 36(4) from FIG. 9A, with a limited section of the ferrule 10 illuminated by a nearly uniform distribution, shows peak temperature in the center, according to the design, dropping towards the rear end 28 of the ferrule 10 and the front end 32 of the ferrule 10 to nearly the background value ($T_0$=293.15K) over a length span of approximately three (3) millimeters along the z-axis.

By optimizing the gradient of the mapping function, and hence a shape of the annular mirror 40, an absorption profile can be obtained that is nearly constant over the entire length L of the ferrule 10. The shape of the annular mirror 40 may be optimixed using an intensity distribution function of:

$$z(y_{inc}) = \frac{R}{\tan\theta_{cone}} + \left(\frac{dz}{dy} - \frac{L}{R}\right)\frac{(y_{inc})^2}{R} - \left(\frac{dz}{dy} - \frac{2L}{R}\right)y_{inc},$$

$$\frac{dz}{dy} = 6.5,$$

where the value of the gradient dz/dy was optimized to obtain a nearly constant absorption density profile and an essentially constant temperature distribution within the ferrule 10.

The above examples demonstrate the general utility of the proposed approach for controlling the extent of the illuminated area and the uniformity of the absorption profile and resulting temperature distribution. In practice, it is typically desired to achieve a uniform or substantially uniform temperature distribution within the first five (5) to six (6) millimeters of the ferrule 10, subject to limited amounts of the ferrule 10 exposure due to the fiber optic connector housing 50 placed around at least a portion of the ferrule 10.

With reference back to FIG. 1B, the laser beam 44 may be emitted from the laser 46 towards the mirror system 36(1) disposed adjacent to the ferrule 10 (block 56D in FIG. 2). The laser 46 may be, for example, a carbon dioxide laser. The laser beam 44 may have a wavelength selected to be highly reflective to the material of the mirror system 36(1), highly absorptive by the material of the ferrule 10, and highly transmissive to the material of the holder member 59.

For example, the laser beam 44 may have the wavelength from 157 nanometers to 10.6 microns, and preferably 9.3 microns. In this way, the laser beam 44 may efficiently provide heat to the bonding agent 22 via the ferrule 10 to thermally activate (e.g., thermally cure) the bonding agent 22 through the ferrule 10, and thereby secure the optical fiber 16 to the ferrule 10.

With reference back to FIG. 1B, the laser beam is received by the mirror system 36(1) and reflected to be incident upon the ferrule 10 (block 56E, in FIG. 2). Specifically, the center mirror 38 receives the laser beam 44 and reflects the laser beam 44 to the annular mirror 40. The annular mirror 40 receives the laser beam 44 from the center mirror 38 and reflects the laser beam 44 to be incident upon the at least a partial length 48 of the ferrule 10. The at least a partial length 48 of the ferrule 10 extends into the fiber optic connector housing 50, thus the laser beam 44 is reflected through the gap 54. In this way, the laser beam 44 is reflected to the ferrule 10 without being directly incident upon the fiber optic connector housing 50.

With reference back to FIG. 1B, at least a portion of the energy of the laser beam 44 is absorbed and flows through the ferrule 10 via conductive heat transfer to the inner surface 24 of the ferrule bore 26 to thermally activate (e.g., thermally cure) the bonding agent (block 56F in FIG. 2). Specifically, the heat arriving at the bonding agent 22 raises the temperature of the bonding agent 22 to at least the securing temperature facilitate securing. In this way, the optical fiber 16 is secured to the ferrule 10.

Figure 10:
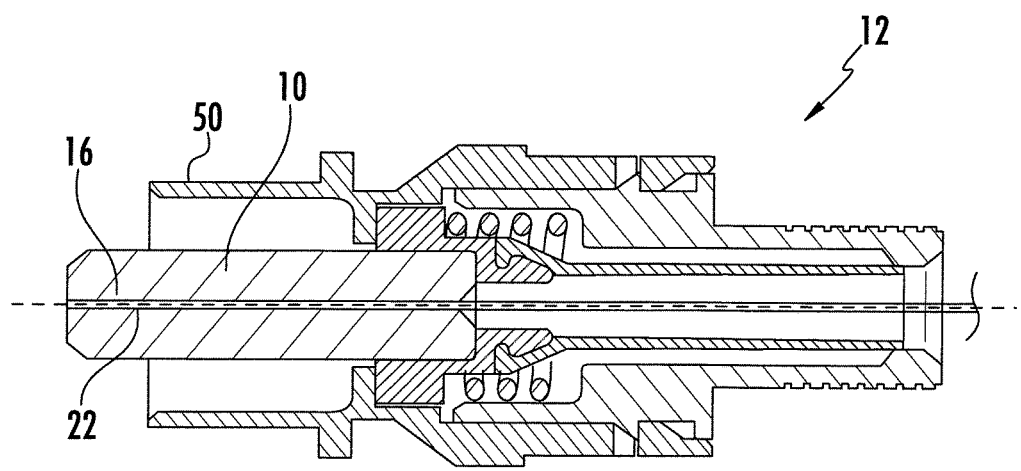
FIG. 10 is a cutaway view of the exemplary fiber optic connector sub-assembly with the optical fiber of FIG. 1A secured to the ferrule of FIG. 1A by thermally securing the bonding agent with the mirror system of FIG. 1B with heat transmitted through the ferrule.
Figure 13A:
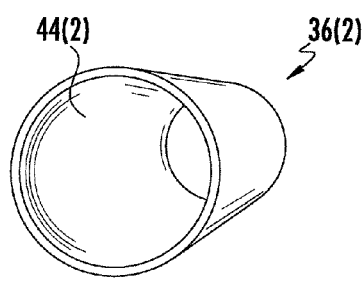
FIGS. 13A-13D are a front perspective view, side cutaway view along the optical axis, front view, and rear view, respectively, of the mirror system comprising the annular mirror of FIG. 11.
Figure 13B:
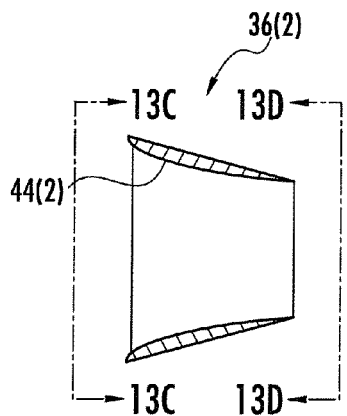
Figure 13C:
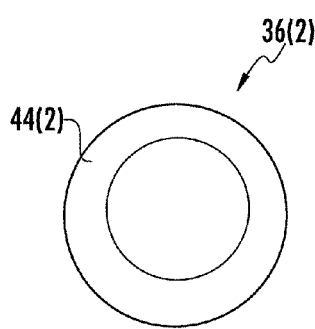
Figure 13D:
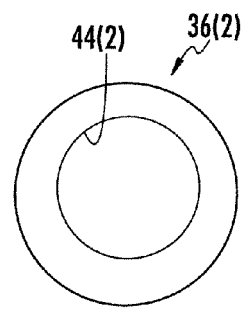

FIG. 10 is a cutaway view of the exemplary fiber optic connector sub-assembly 12 with the optical fiber of FIG. 1A secured to the ferrule 10 of FIG. 1A by thermally securing the bonding agent 22 with the mirror system 36(1) of FIG. 1B through the ferrule 10. In this way, the optical fiber 16 is efficiently secured to the ferrule 10 using thermal securing without damaging the fiber optic connector housing 50.

Now that the method for the securing the optical fiber 16 to the ferrule 10 has been discussed relative to the mirror system 36(1), an alternative embodiment of a mirror system 36(5) securing the optical fiber to the ferrule 10 is discussed with reference to FIG. 11. The mirror system 36(5) is similar to mirror system 36(1), thus only differences will be discussed for clarity and conciseness.

The mirror system 36(5) comprises an annular mirror 40(2). The annular mirror 40(2) is configured to receive the laser beam 44(2) propagating parallel or substantially parallel to the optical axis $A_1$ of the ferrule 10 and reflect the laser beam 44(2) to be incident upon the at least a partial length 48 of the ferrule 10. The at least a partial length 48 may extend into the fiber optic connector housing 50. In this manner, the mirror system 36(5) thermally activates (e.g., cures) the bonding agent 22 through the ferrule 10 to secure the optical fiber 16 to the ferrule 10.

It is noted that the mirror system 36(5) may not include the center mirror 38 (FIG. 1B) to thereby leave an end face 55 of the ferrule 10 available for direct irradiation by the laser beam 44(2). FIG. 12 is a cross-sectional view of an example 44A of the laser beam 44(2) of FIG. 11 comprising a ring-shaped laser beam 64. The ring-shaped laser beam 64 may be created, for example, by passing the laser beam 44(2) through an axicon lens 49 (FIG. 11) or by blocking the center of the laser beam 44(2) with reflective or absorbing materials. The ring-shaped laser beam 64 permits the laser beam 44(2) to be distributed upon the at least a partial length 48 of the ferrule 10 exclusively with the annular mirror 40(2) without the center mirror 38. In this manner, the end face 55 of the ferrule 10 may be free of direct irradiation from the laser beam 44(2) which could cause non-uniform heating of the bonding agent 22.

FIG. 12B is a cross-sectional view of an alternative example 44B of the laser beam 44(2) of FIG. 11, depicting at least one laser spot 61 moving around the optical axis $A_1$ of the ferrule 10 as the laser beam 44(2) is emitted toward the annular mirror 40(2) instead of directly incident upon the ferrule 10 from the laser 46. The laser spot 61 may be emitted, for example, by the laser 46 which may move (not shown) and/or by one or more optical lenses (not shown) which move. The laser spot 61 may move to avoid direct irradiation of the ferrule 10, and instead may irradiate the ferrule 10 via the annular mirror 40(2) of the mirror system 36(5). In this manner, the end face 55 of the ferrule 10 may be free of direct irradiation from the laser beam 44(2) which could cause non-uniform heating of the bonding agent 22.

FIGS. 13A-13D are a front perspective view, side cut-away view along the optical axis, front view, and rear view, respectively, of the mirror system 36(5) comprising the annular mirror 40(2). The annular mirror 40(2) comprises a ring shape which may be easily positioned around the ferrule 10. In this manner, the annular mirror 40(2) may more easily reflect the laser beam 44(2) around the circumference of the ferrule 10.

FIG. 14A is a schematic diagram of fiber optic connector sub-assembly 12 and the mirror system 36(5) of FIG. 11, illustrating dimensional relationships of the mirror system 36(5) and the ferrule 10 to the light rays of the laser beam 44(2). FIG. 14B is a chart of an absorption of energy of the laser beam 44 as a function of longitudinal position along the ferrule 10 of FIG. 14A. Uniform or substantially uniform absorption occurs at values of z along the ferrule 10 between one (1) millimeters and six (6) millimeters. In this manner, the mirror system 36(5) may be used to reflect the laser beam 44(2) in a controllable intensity to be absorbed uniformly or substantially uniformly along the at least the partial length 48 of the ferrule 10 extending into the gap 54 of the fiber optic connector housing 50 to accelerate securing of the bonding agent 22 while avoiding damage to the fiber optic connector housing 50. It is noted that the gap 54 includes a minimum gap width $L_G$ (FIG. 14A), for example, of 1.25 millimeters or less, measured orthogonal to the outer surface 25 of the ferrule 10.

Now that the mirror system 36(5) has been introduced, optional block 66 may be introduced to the method 53 to accommodate the mirror system 36(2). With reference back to FIG. 11, the laser beam 44 is received by the mirror system 36(5) and reflected to be incident upon the ferrule 10 (block 66, in FIG. 2). Specifically, the annular mirror 40(2) receives the laser beam 44, which may propagate parallel or substantially parallel to the optical axis $A_1$ of the ferrule 10, and reflects the laser beam 44 to be incident upon the at least a partial length 48 of the ferrule 10. The at least a partial length 48 of the ferrule 10 extends into the fiber optic connector housing 50; thus the laser beam 44 is reflected through the gap 54. In this way, the laser beam 44 is reflected to the ferrule 10 without being directly incident upon the fiber optic connector housing 50.

Figure 15:
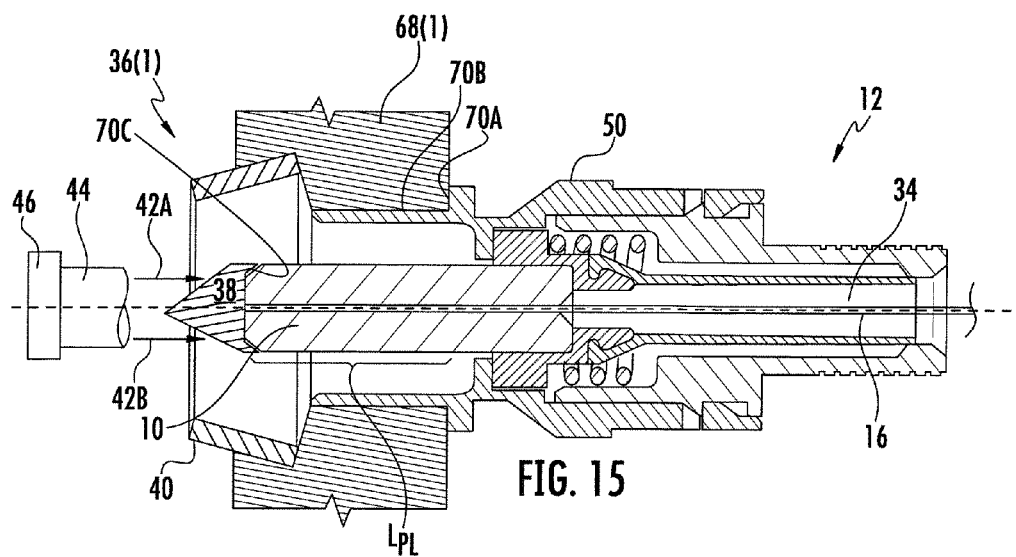
FIG. 15 is a cutaway view of the exemplary fiber optic connector sub-assembly and the mirror system of FIG. 1B, illustrating an exemplary fixture to secure the ferrule while the mirror system reflects the laser beam.

Lastly, exemplary fixtures will be discussed to interface with the mirror system 36 and/or the fiber optic connector sub-assembly 12. In this regard, FIG. 15 is a cutaway view of the exemplary fiber optic connector sub-assembly 12 and the mirror system 36(1) of FIG. 1B, illustrating an exemplary fixture 68(1) to secure the ferrule 10 while the mirror system 36(1) reflects the laser beam 44. The fixture 68(1) may removably interface with the fiber optic connector housing 50 at locations 70A, 70B. In addition, the center mirror 38 of the mirror system 36(1) may removably interface with the ferrule 10 at a location 70C. The fixture 68(1) may be made of a rigid durable material that in one non-limiting embodiment may be metal. In this manner, the fiber optic connector housing 50 and the ferrule 10 may be precisely located relative to the laser 46 and the laser beam 44 to avoid damage of the fiber optic connector housing 50.

Figure 16:
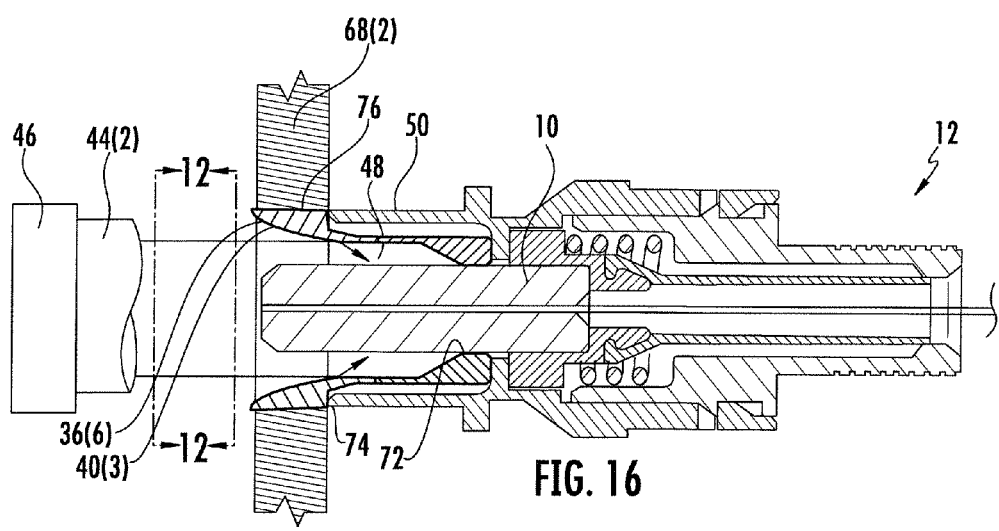
FIG. 16 is a cutaway view of the exemplary fiber optic connector sub-assembly of FIG. 1A and another embodiment of a mirror system, illustrating an exemplary fixture to secure the ferrule while the mirror system reflects the laser beam.

Similarly, FIG. 16 is a cutaway view of the exemplary fiber optic connector sub-assembly 12 of FIG. 1A and another embodiment of a mirror system 36(6), illustrating an exemplary fixture 68(2) to secure the ferrule while the mirror system 36(6) reflects the laser beam 44(2). The mirror system 36(6) is similar to the mirror system 36(5) of FIG. 11 and so only differences will be discussed for clarity and conciseness. The mirror system 36(6) comprises an annular mirror 40(3) which may extend to form a removable interface 72 with the ferrule 10. The removable interface 72 may center the annular mirror 40(3) with respect to the ferrule 10. Next, the annular mirror 40(3) may also form a removable interface 74 with the fiber optic connector housing 50. In this manner, the removable interface 74 may center the annular mirror 40(3) with respect to the fiber optic connector housing 50. The annular mirror 40(3) may also include a removable interface 76 to the fixture 68(2). In this manner, the fiber optic connector housing 50 and the ferrule 10 may be precisely located relative to the laser 46 and the laser beam 44(2) to avoid damage of the fiber optic connector housing 50.

Figure 17:
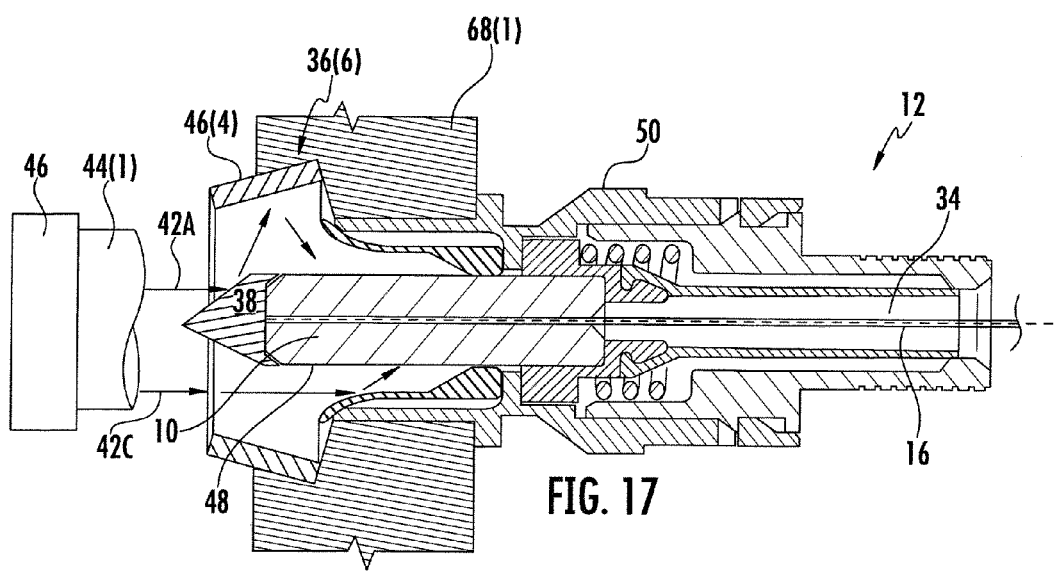
FIG. 17 is a cutaway view of both the exemplary fiber optic connector sub-assembly of FIG. 1A and another exemplary embodiment of a mirror system comprising a combination annular mirror shaped and disposed to deflect two exemplary light rays of a laser beam onto at least a partial length of the ferrule, illustrating the mirror system comprising an annular mirror at least partially within the fiber optic connector housing.

Other examples of the mirror system 36 with fixtures are possible. There is a need to provide uniform or substantially uniform heating of the bonding agent 22 by avoiding direct irradiation of the end face 55 of the ferrule 10 yet provide deeper penetration of the laser beam 44(1) into the fiber optic connector housing 50 as provided by the mirror system 36(5) of FIG. 11. In this regard, FIG. 17 is a cutaway view of both the exemplary fiber optic connector sub-assembly 12 of FIG. 1A and another exemplary embodiment of a mirror system 36(6) comprising a combination version of the annular mirror 40(4) shaped and disposed to deflect at least two exemplary light rays 42A, 42C of the laser beam 44(1) onto the at least a partial length 48 of the ferrule 10. Similar to the mirror system 36(1) of FIG. 1B, the light ray 42A may be reflected from the center mirror 38 and then reflected by the annular mirror 40(4) before being incident upon the ferrule 10. Further, similar to the mirror system 36(5) of FIG. 11, the light ray 42C may be emitted into the fiber optic connector housing 50 before being reflected by the annular mirror 40(4) before being incident upon the ferrule 10. In this way, uniform or substantially uniform heating of the bonding agent 22 may be achieved deeper into the fiber optic connector housing 50 while avoiding laser beam incidence at the end face 55 where non-uniform heating could occur.

FIGS. 18A-18D are a front perspective view, side cutaway view along the optical axis, front view, and rear view, respectively, of the mirror system 36(6) comprising the combination annular mirror of FIG. 17. The mirror system 36(6) is similar to the mirror systems 36(1), 36(5) discussed earlier and so only the differences will be discussed for clarity and conciseness. The mirror system 36(6) comprises an annular mirror portion 40A similar to the annular mirror 40 of mirror system 36(1), and an annular mirror portion 40B similar to the annular mirror 40(2) of mirror system 36(5). The annular mirror portions 40A, 40B may be integral or may be attached by at least one structural leg 78. In this way, the mirror system 36(6) may be structured to provide uniform or substantially uniform heating of the bonding agent 22 deeper into the fiber optic connector housing 50 than achievable with the mirror system 36(1) while avoiding direct laser beam 44(1) irradiation at the end face 55 where non-uniform heating could occur.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for securing an optical fiber to a ferrule that is at least partially disposed within a fiber optic connector housing, comprising:
    disposing an end portion of an optical fiber and a temperature-sensitive bonding agent within a ferrule bore of a ferrule, the ferrule being at least partially disposed within a fiber optic connector housing;
    emitting a laser beam from a laser toward a mirror system disposed adjacent to the ferrule; and
    reflecting the laser beam with the mirror system to be incident upon at least a partial length of the ferrule to thermally activate the bonding agent through the ferrule to secure the optical fiber to the ferrule,
    wherein the at least the partial length of the ferrule extends within the fiber optic connector housing.

2. The method of claim 1, wherein the reflecting the laser beam with the mirror system comprises receiving the laser beam propagating parallel or substantially parallel to the optical axis of the ferrule with an annular mirror of the mirror system and reflecting the laser beam to the at least the partial length of the ferrule with the annular mirror.

3. The method of claim 2, wherein the receiving the laser beam with the annular mirror comprises receiving at least a portion of the laser beam at an annular incidence location of the annular mirror, and the annular incidence location is disposed in a gap between the fiber optic housing and the ferrule.

4. The method of claim 3, wherein the receiving the at least the portion of the laser beam at the annular incidence location disposed in the gap comprises a minimum gap width of 1.25 millimeters or less measured orthogonal to an outer surface of the ferrule.

5. The method of claim 2, wherein the receiving the laser beam with the annular mirror comprises receiving at least a portion of the laser beam at an annular incidence location of the annular mirror, and the annular incidence location is disposed outside of the fiber optic connector housing.

6. The method of claim 5, wherein the reflecting the laser beam to the at least the partial length of the ferrule with the annular mirror comprises reflecting the at least the portion of the laser beam through a gap to be incident upon the at least the partial length of the ferrule, wherein the gap is disposed between the ferrule and the fiber optic connector housing, and the gap is 1.25 millimeters or less measured orthogonal to an outer surface of the ferrule.

7. The method of claim 1, further comprising shaping and orientating the mirror system to reflect the laser beam to be incident upon the at least the partial length of the ferrule with an intensity distribution which is uniform or substantially uniform around a circumference of the ferrule.

8. The method of claim 7, further comprising holding the mirror system stationary with respect to the ferrule during emission of the laser beam.

9. The method of claim 8, further comprising holding the laser beam stationary with respect to the ferrule.

10. The method of claim 1, wherein the reflecting the laser beam with the mirror system comprises:
receiving the laser beam propagating parallel or substantially parallel to an optical axis of the ferrule with a center mirror of the mirror system and reflecting the laser beam to an annular mirror of the mirror system; and
reflecting the laser beam with the annular mirror to the at least the partial length of the ferrule.

11. The method of claim 10, wherein the receiving the laser beam with the center mirror comprises receiving the laser beam with a conical-shaped reflective surface of the center mirror having an axis of rotational symmetry aligned with the optical axis of the ferrule.

12. The method of claim 1, wherein the reflecting the laser beam with the mirror system further comprises receiving and reflecting the laser beam to be incident upon the at least the partial length of the ferrule with a uniform or substantially uniform incident energy distribution along the optical axis of the ferrule and within the at least the partial length.

13. The method of claim 1, wherein the reflecting the laser beam with the mirror system further comprises receiving and reflecting the laser beam to be incident upon the at least the partial length of the ferrule with an incident energy distribution along the optical axis of the ferrule to facilitate uniform or substantially uniform energy absorption of the laser beam along the optical axis of the ferrule and within the at least the partial length of the ferrule.

14. The method of claim 1, wherein the reflecting the laser beam with the mirror system comprises reflecting the laser beam to be incident upon the at least the partial length of the ferrule, the at least the partial length extending at least two (2) millimeters from an end face of the ferrule and in a direction parallel to the optical axis of the ferrule.

15. The method of claim 1, wherein the disposing the end portion of the optical fiber within the ferrule bore of the ferrule comprises the ferrule comprising zirconium dioxide.

16. The method of claim 1, wherein the emitting the laser beam from the laser comprises emitting the laser beam having a uniform or substantially uniform intensity distribution within a spot size, and the spot size defined by a full-width at half maximum technique.

17. The method of claim 1, wherein the emitting the laser beam from the laser comprises emitting the laser beam having a wavelength from 157 nanometers to 10.6 microns.

18. The method of claim 1, wherein the emitting the laser beam from the laser comprises shaping the laser beam to a ring-shaped laser beam.

19. A method for securing an optical fiber to a ferrule that is at least partially disposed within a fiber optic connector housing, comprising:
disposing an end portion of an optical fiber and a temperature-sensitive bonding agent within a ferrule bore of a ferrule;
emitting a laser beam from a laser toward a mirror system disposed adjacent to the ferrule; and
reflecting the laser beam with the mirror system to be incident upon at least a partial length of the ferrule to thermally activate the bonding agent through the ferrule to secure the optical fiber to the ferrule, the at least the partial length extending at least two (2) millimeters from an end face of the ferrule and in a direction parallel to the optical axis of the ferrule,
wherein the ferrule is at least partially disposed within a fiber optic connector housing when reflecting the laser beam with the mirror system.

20. A method for securing an optical fiber to a ferrule that is at least partially disposed within a fiber optic connector housing, comprising:
disposing an end portion of an optical fiber and a temperature-sensitive bonding agent within a ferrule bore of a ferrule, the ferrule being at least partially disposed within a fiber optic connector housing;
emitting a laser beam from a laser toward a mirror system disposed adjacent to the ferrule; and
reflecting the laser beam with the mirror system to be incident upon at least a partial length of the ferrule to thermally activate the bonding agent through the ferrule to secure the optical fiber to the ferrule,
wherein the reflecting the laser beam with the mirror system comprises receiving at least a portion the laser beam at an annular incidence location of an annular mirror of the mirror system and reflecting the laser beam to the at least the partial length of the ferrule with the annular mirror, the annular incidence location being disposed in a gap between the fiber optic housing and the ferrule.

21. The method of claim 20, wherein laser beam is propagating parallel or substantially parallel to the optical axis of the ferrule when the at least a portion of the laser beam is received at the annular incidence location of the annular mirror.

* * * * *